United States Patent
Kayama

(10) Patent No.: US 9,940,082 B2
(45) Date of Patent: Apr. 10, 2018

(54) SYSTEM, PRINTING APPARATUS AND METHOD FOR CONTROLLING THE SAME, AND POST-PROCESSING APPARATUS AND METHOD FOR CONTROLLING THE SAME FOR PERFORMING RE-PRINTING PROCESSING FOR A FIRST JOB PREFERENTIALLY

(71) Applicant: CANON KABUSHIKI KAISHA, Tokyo (JP)

(72) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/092,387

(22) Filed: Apr. 6, 2016

(65) Prior Publication Data

US 2016/0299731 A1    Oct. 13, 2016

(30) Foreign Application Priority Data

Apr. 10, 2015  (JP) .................................. 2015-081160

(51) Int. Cl.
    *G06F 3/12*    (2006.01)
(52) U.S. Cl.
    CPC .......... *G06F 3/1263* (2013.01); *G06F 3/1205* (2013.01)
(58) Field of Classification Search
    None
    See application file for complete search history.

(56) References Cited

U.S. PATENT DOCUMENTS

| | | | | |
|---|---|---|---|---|
| 2007/0109586 | A1* | 5/2007 | Yamada | G06F 3/121 358/1.14 |
| 2007/0291286 | A1* | 12/2007 | Utsunomiya | G03G 15/5062 358/1.8 |
| 2009/0052913 | A1* | 2/2009 | Kawamura | B41J 13/0036 399/45 |
| 2009/0279137 | A1 | 11/2009 | Mori | |
| 2010/0271672 | A1* | 10/2010 | Nakamichi | H04N 1/0057 358/498 |
| 2013/0120799 | A1 | 5/2013 | Maeda | |
| 2016/0299726 | A1 | 10/2016 | Hayashi | |
| 2016/0299727 | A1 | 10/2016 | Hayashi | |
| 2016/0299732 | A1 | 10/2016 | Mori | |

FOREIGN PATENT DOCUMENTS

| | | |
|---|---|---|
| JP | 2007-241648 A | 9/2007 |
| JP | 2008-110576 A | 5/2008 |

* cited by examiner

*Primary Examiner* — Henok A Shiferaw
(74) *Attorney, Agent, or Firm* — Canon USA, Inc. I.P. Division

(57) ABSTRACT

At least one embodiment of a post-processing apparatus performs post-processing on a product printed by a printing apparatus, and transmits, to the printing apparatus, instruction information instructing the printing apparatus to perform print processing for a first job preferentially. At least one embodiment of the printing apparatus receives, from the post-processing apparatus, the instruction information instructing the printing apparatus to perform the print processing for the first job preferentially, and performs control so as to perform the print processing for the first job preferentially over print processing for a second job, based on the instruction information.

15 Claims, 20 Drawing Sheets

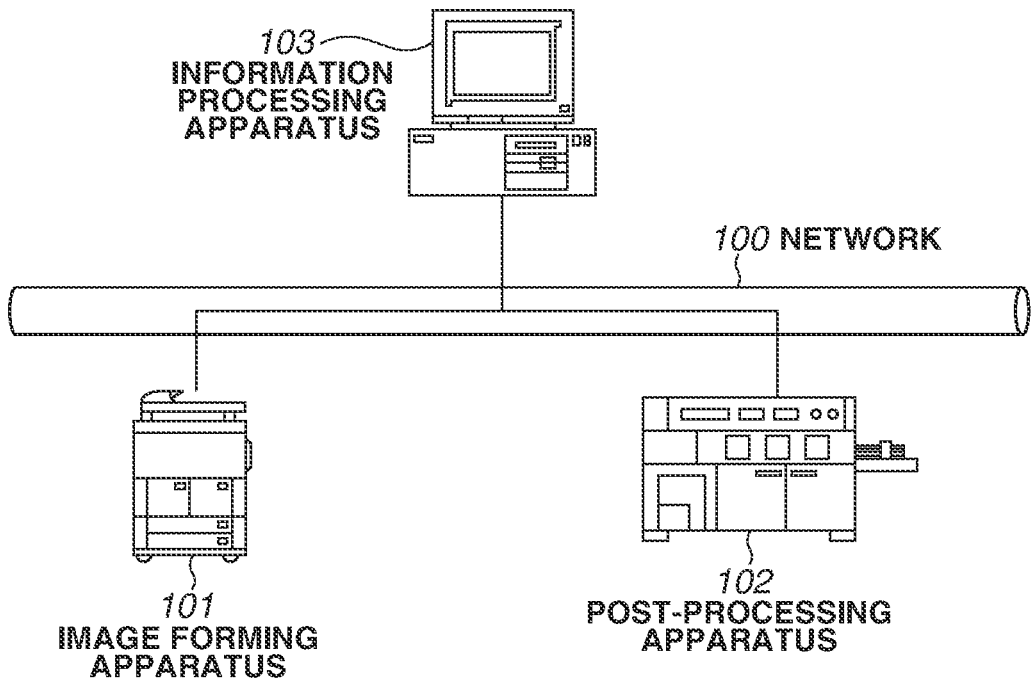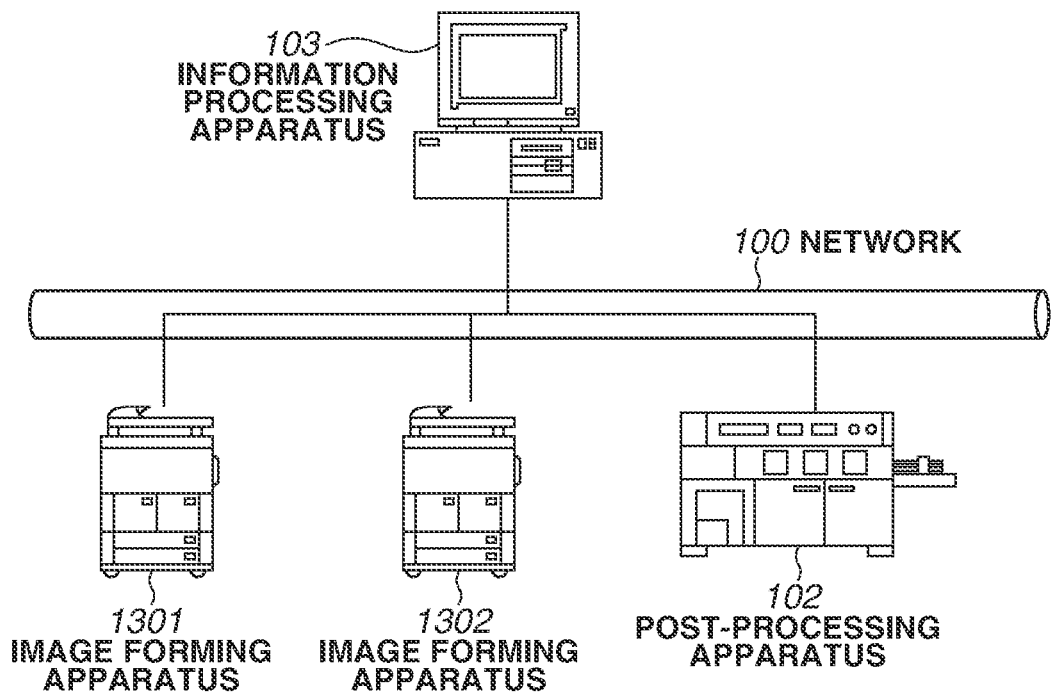

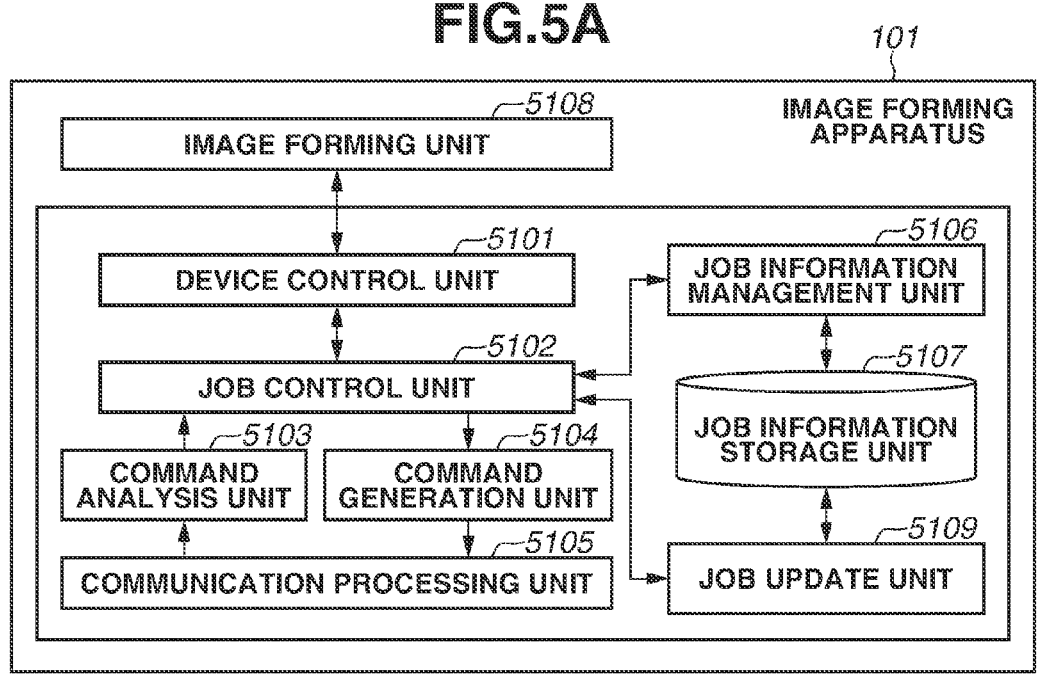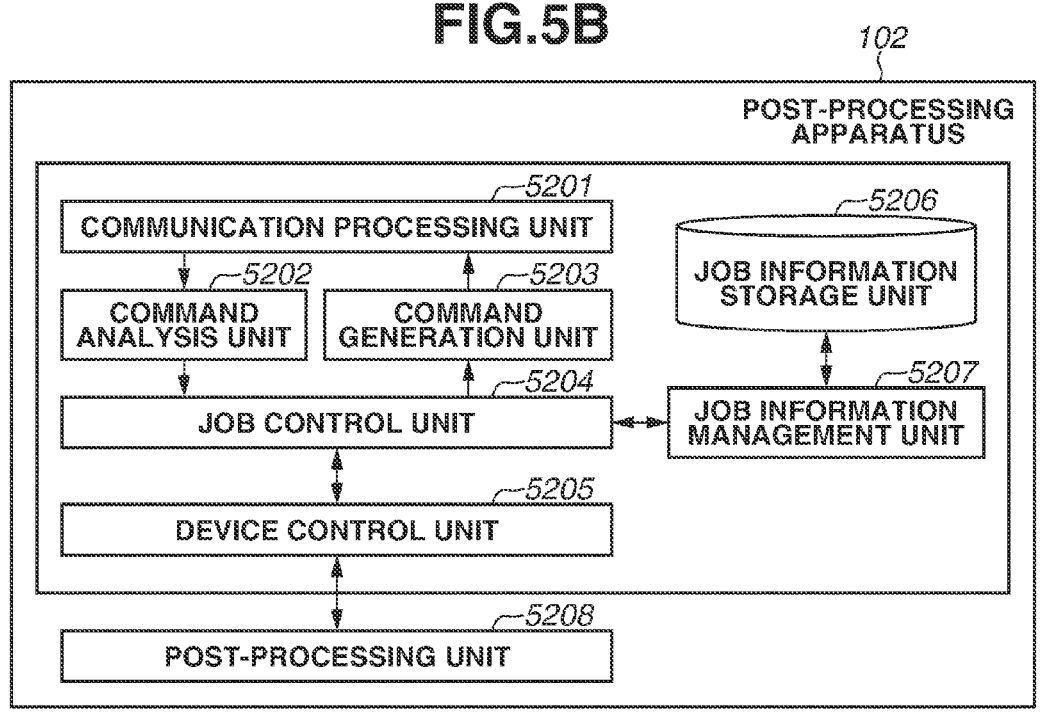

```
<JMF xmlns="http://www.CIP4.org/JDFSchema_1_1" MaxVersion="1.5" SenderID="Finisher" TimeStamp="2013-09-18T10:58:27+02:00"
Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause">  ~61001
        <PipeParams JobID="J1" PipeID="PipeSheet" Duration="10" Unit="Minutes">  ~61002
            <AmountPool>
                <PartAmount>
                    <PartCondition="Waste" SetIndex="34 35"/>  ~61003
                </PartAmount>
            </AmountPool>
        </PipeParams>
    </Command>
</JMF>
```

6101

```
<JMF xmlns="http://www.CIP4.org/JDFSchema_1_1" MaxVersion="1.5" SenderID="Finisher" TimeStamp="2013-09-18T10:58:27+02:00"
Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause">
        <PipeParams JobID="J1" PipeID="PipeSheet" PipeType="Interrupt">  ~61011
            <InterruptOption Promote="True">
                <AmountPool>
                    <PartAmount>
                        <Part SetIndex="34 35"/>  ~61012
                    </PartAmount>
                </AmountPool>
            </InterruptOption>
        </PipeParams>
    </Command>
</JMF>
```

```
<JMF xmlns="http://www.CIP4.org/JDFSchema_1_1" MaxVersion="1.5" SenderID="Printer" TimeStamp="2013-09-18T10:58:26+02:00"
Version="1.5" xmlns:xsi="http://www.w3.org/2001/XMLSchema-instance" xsi:type="JMFRootMessage">
    <Command ID="m.1349935098._000002" Type="PipePush" xsi:type="CommandPipePush">         ~62001
        <PipeParams JobID="J1" PipeID="PipeSheet">         ~62002
            <AmountPool>
                <PartAmount Amount="1">
                    <Part DocTags="Cover" SetIndex="0"/>
                </PartAmount>
                <PartAmount ActualAmount="1">
                    <Part DocTags="Cover" SetIndex="0" SheetIndex="0"/>
                </PartAmount>
            </AmountPool>
        </PipeParams>
    </Command>
</JMF>
```

6201

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000008" Type="PipePush" xsi:type="CommandPipePush">
        <PipeParams JobID="J1" PipeID="PipeSheet">
            <AmountPool>
                <PartAmount Amount="7">
                    <Part DocTags="Body" SetIndex="35"/>         ~62011
                </PartAmount>
                <PartAmount ActualAmount="1">
                    <Part DocTags="Body" SetIndex="35" SheetIndex="4"/>
                </PartAmount>
            </AmountPool>
        </PipeParams>
    </Command>
</JMF>
```

6202

```
<JMF xmlns="http://www.CIP4.org/JDFSchema_1_1" MaxVersion="1.5" SenderID="TestSender" TimeStamp="2013-09-
18T10:58:27+02:00" Version="1.5" xmlns:xsi="http://www.w3.org/2001/XMLSchema-instance" xsi:type="JMFRootMessage">
    <Command ID="m.587730553._000010" SenderID="Finisher" Type="PipePush" xsi:type="CommandPipePush">
        <PipeParams JobID="J1" PipeID="PipeSheet">
            <AmountPool>
                <PartAmount>
                    <Part SetIndex="34~-1"/>         ~62021
                </PartAmount>
            </AmountPool>
        </PipeParams>
    </Command>
</JMF>
```

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000011" Type="PipePush" xsi:type="CommandPipePush">
        <PipeParams JobID="J1" PipeID="PipeSheet">
            <AmountPool>
                <PartAmount Amount="1">
                    <Part DocTags="Cover" SetIndex="34"/>    ~62031
                </PartAmount>
                <PartAmount ActualAmount="1">
                    <Part DocTags="Cover" SetIndex="34" SheetIndex="0"/>
                </PartAmount>
            </AmountPool>
        </PipeParams>
    </Command>
</JMF>
```

6204

```
<JMF xmlns="http://www.CIP4.org/JDFSchema_1_1" MaxVersion="1.5" SenderID="Printer" TimeStamp="2013-09-18T10:58:26+02:00"
Version="1.5" xmlns:xsi="http://www.w3.org/2001/XMLSchema-instance" xsi:type="JMFRootMessage">
    <Command ID="m.1349935098._000002" Type="PipePush" xsi:type="CommandPipePush">
        <PipeParams JobID="J2" PipeID="PipeSheet">
            <JobInfo>
                <OrderID>1234567</OrderID>
                <Copies>3</Copies>       ~62041
                <Sheets>100</Sheets>
                <Duration>500</Duration>
            </JobInfo>
        </PipeParams>
    </Command>
</JMF>
```

FIG.6C

```
                                                                    6300
<JMF xmlns="http://www.CIP4.org/JDFSchema_1_1" MaxVersion="1.5" SenderID="TestSender" TimeStamp="2013-09-18T10:58:27+02:00"
Version="1.5" xmlns:xsi="http://www.w3.org/2001/XMLSchema-instance" xsi:type="JMFRootMessage">
    <Command ID="m.587730553._000010" SenderID="Finisher" Type="PipePull" xsi:type="CommandPipePull">~63001
        <PipeParams JobID="J1" PipeID="PipeSheet" PipeType="Interrupt" Reason="JobSettings">~63002
            <JobInfo>
                <OrderID>1234567</OrderID>
                <JobID>J2</JobID>
                <JobName>Job X</JobName>~63003
                <Copies>5, 7, 8</Copies>
                <Media Demension "1008.0 612.0" DescriptiveName="Blue"/>
                <ImageShift Unit="mm">0.5</ImageShift>
            </JobInfo>
        </PipeParams>
    </Command>
</JMF>
```

FIG.6D

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000017" Type="PipeClose" xsi:type="CommandPipeClose">  ~64001
        <PipeParams JobID="J1" PipeID="PipeSheet">  ~64002
            <AmountPool>
                <PartAmount>
                    <Part SetIndex="0~221"/>
                </PartAmount>
            </AmountPool>
        </PipeParams>
    </Command>
</JMF>
```
6400

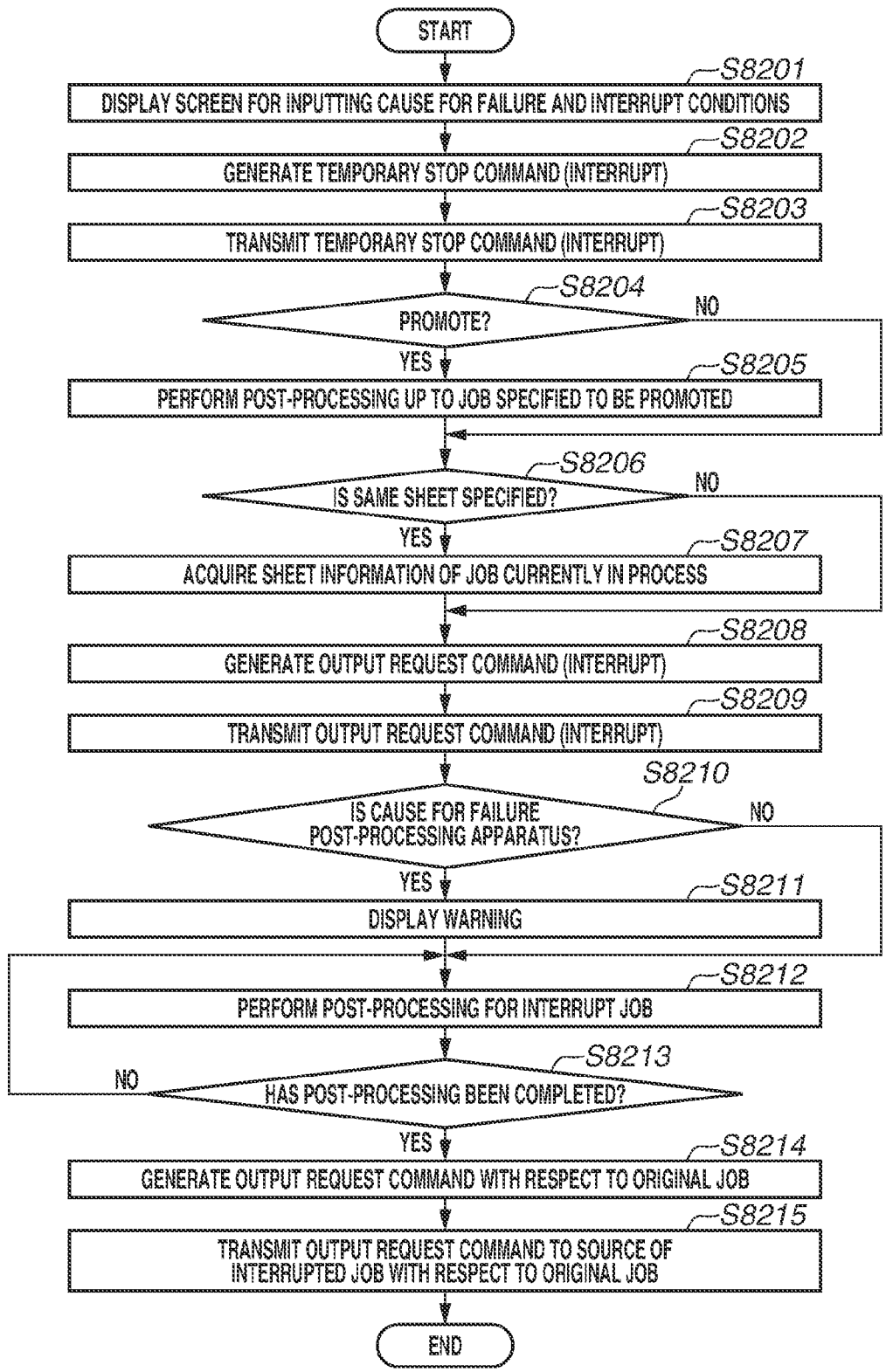

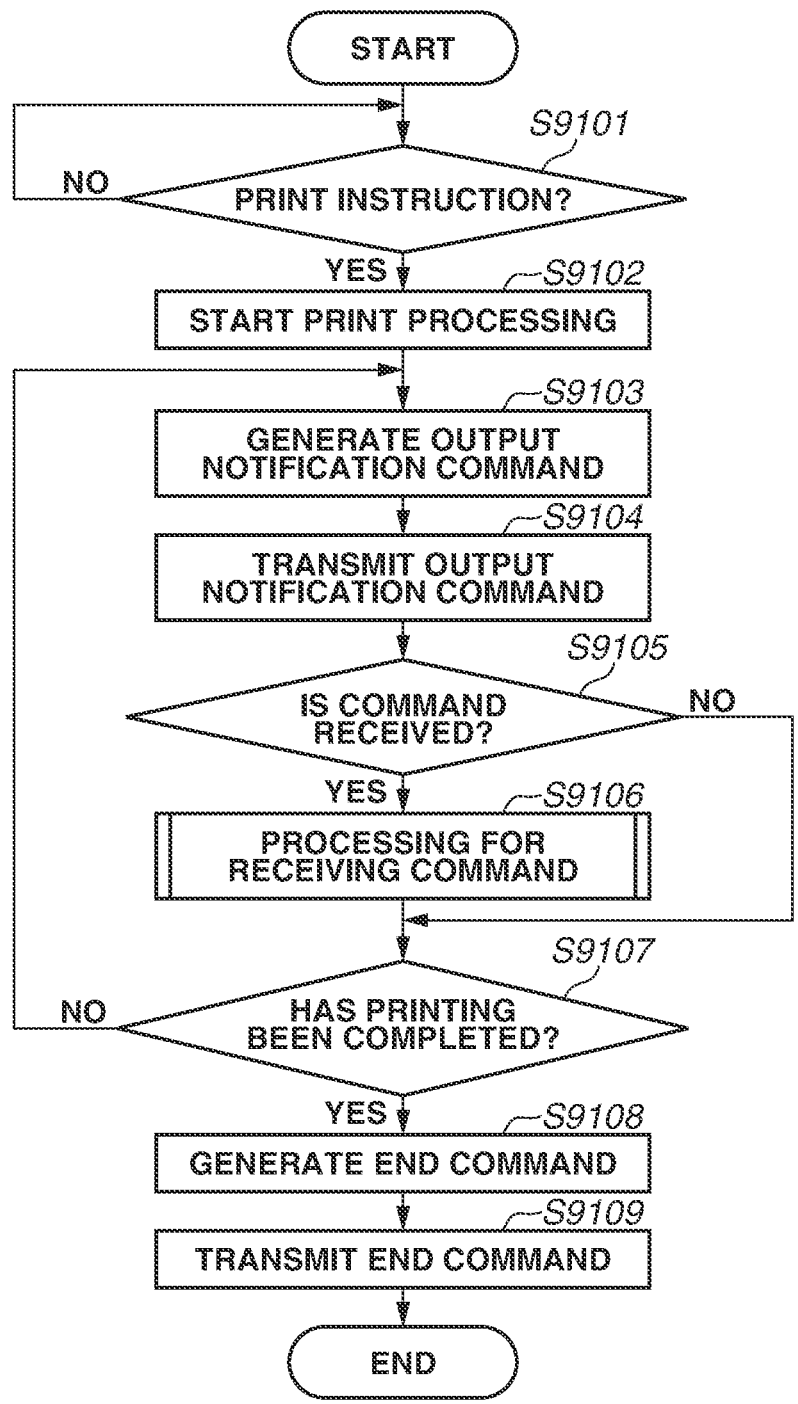

```
<JDF ID="n_000009" JobID="J1" JobPartID="n_000002.2" MaxVersion="1.4" Status="Waiting" Type="Combined" Types="Collecting Stitching" Version="1.4"
xmlns="http://www.CIP4.org/JDFSchema_1_1" xmlns:xsi="http://www.w3.org/2001/XMLSchema-instance" xsi:type="Combined">
    <AuditPool>
        <Created AgentName="CIP4 JDF Writer Java" AgentVersion="1.4a BLD 74" ID="a_000010" TimeStamp="2013-09-19T15:36:28+02:00"/>
    </AuditPool>
    <ResourceLinkPool>
        <ComponentLink ProcessUsage="Cover" Usage="Input" rRef="r_000008">
            <Part DocTags="Cover" SetIndex="0--1"/>
        </ComponentLink>
        <ComponentLink CombinedProcessIndex="0" Usage="Input" rRef="r_000008">
            <Part DocTags="Body" SetIndex="0--1"/>
        </ComponentLink>
        <StitchingParamsLink CombinedProcessIndex="1" Usage="Input" rRef="r_000011"/>
        <ComponentLink Amount="1" CombinedProcessIndex="1" Usage="Output" rRef="r_000012"/>
    </ResourceLinkPool>
    <ResourcePool>
        <StitchingParams Class="Parameter" ID="r_000011" Status="Available"/>
        <Component Class="Quantity" ComponentType="FinalProduct Block" ID="r_000012" Status="Unavailable"/>                 10001
        <Component Automation="Dynamic" Class="Quantity" ComponentType="PartialProduct Sheet" ID="r_000008" PartIDKeys="SetIndex DocTags"
PipeID="PipeSheet" PipeProtocol="JMFPush" Status="Unavailable" PipePause="100.0" PipeResume="10.0">
            <Component SetIndex="0--1">
                <Component DocTags="Cover" SurfaceCount="2"/>
                <Component DocTags="Body" SurfaceCount="-1"/>
            </Component>
        </Component>
    </ResourcePool>
</JDF>
```

```
<JMF xmlns="http://www.CIP4.org/JDFSchema_1_1" MaxVersion="1.5" SenderID="Printer" TimeStamp="2013-09-18T10:58:27-02:00"
Version="1.5" xmlns:xsi="http://www.w3.org/2001/XMLSchema-instance" xsi:type="JMFRootMessage">
    <Command ID="M1" Type="SubmitQueueEntry" xsi:type="CommandSubmitQueueEntry">   ~11001
        <QueueSubmissionParams URL="File://XXXXX.jdf"/>   ~11002
    </Command>
</JMF>
```

```
<JMF xmlns="http://www.CIP4.org/JDFSchema_1_1" MaxVersion="1.5" SenderID="Printer" TimeStamp="2013-09-18T10:58:27-02:00"
Version="1.5" xmlns:xsi="http://www.w3.org/2001/XMLSchema-instance" xsi:type="JMFRootMessage">
    <Command ID="M1" Type="SubmitQueueEntry" xsi:type="CommandSubmitQueueEntry">   ~16001
        <QueueSubmissionParams URL="File://XXXXXX.jdf" Priority="100"/>   ~16002
    </Command>
</JMF>
```

JOB ERROR
  PROCESSING JOB HAS FAILED.

JOB ID: J2
  ☑ INPUT CAUSE FOR ERROR ~ *12001*
     LOCATION: ◉ COMPUTER    ADDRESS: [        ]
               ○ PRINTER
               ◉ FINISHER
        CAUSE: [ INVALID IMAGED POSITION OF IMAGE ]

☑ CREATE INTERRUPT SETTING ~ *12002*
     ☑ CREATE PROMOTE SETTING
        SET: ◉ ALL
             ○ SPECIFY SET NUMBER  [ 34-35 ]
  ☑ SPECIFY SAME SHEET SIZE AS CURRENT JOB ~ *12003*
  ☑ CHANGE SETTING OF JOB   [ CHANGE SETTING ] ~ *12004*

[ OK ]   [ CANCEL ]

PRIORITIZATION PROCESSING
  A JOB WITH PRIORITIZATION PROCESSING SPECIFIED
  THEREFOR IS RECEIVED.

JOB ID: J2
  ☑ CREATE INTERRUPT SETTING ~ *17001*
     ☑ CREATE PROMOTE SETTING
        SET: ◉ ALL
             ○ SPECIFY SET NUMBER  [ 34-35 ]
  ☑ SPECIFY SAME SHEET SIZE AS CURRENT JOB ~ *17002*

[ OK ]   [ CANCEL ]

SYSTEM, PRINTING APPARATUS AND METHOD FOR CONTROLLING THE SAME, AND POST-PROCESSING APPARATUS AND METHOD FOR CONTROLLING THE SAME FOR PERFORMING RE-PRINTING PROCESSING FOR A FIRST JOB PREFERENTIALLY

BACKGROUND OF THE INVENTION

Field of the Invention

The present disclosure relates to a technique for producing a product by performing post-processing on a print product output from an image forming apparatus with use of a post-processing apparatus.

Description of the Related Art

Conventionally, in the commercial printing industry, various products have been produced by combining an image forming apparatus and a post-processing apparatus. For example, an advanced product can be produced by setting a print product on the post-processing apparatus after the image forming apparatus performs print processing to output the print product, and performing post-processing (after processing), such as bookbinding and cutting, thereon.

In such a configuration, the print processing by the image forming apparatus and the post-processing by the post-processing apparatus may be performed in parallel with each other to improve productivity associated with the production. More specifically, while the print product is output from the image forming apparatus, this print product is transferred to the post-processing apparatus by being manually carried or via a conveyor belt. The post-processing apparatus produces the product by performing the post-processing on the received print product as needed.

For example, Japanese Patent Application Laid-Open No. 2008-110576 discusses a technique for causing the image forming apparatus to stop the print processing of print data that is currently being printed, and executes interrupt printing of print data that is waiting in the image forming apparatus.

However, the technique discussed in Japanese Patent Application Laid-Open No. 2008-110576 allows the image forming apparatus to execute the interrupt printing of the print data that is waiting in the image forming apparatus, but does not include consideration of interrupt requested from the post-processing apparatus that performs the post-processing on the product printed by the image forming apparatus. Therefore, the image forming apparatus cannot be instructed to execute the interrupt from the post-processing apparatus, for example, when the post-processing apparatus has failed in the production of the product and it is desired to produce this product preferentially over another product.

SUMMARY OF THE INVENTION

The present disclosure has been made at least in part in consideration of the above-described issue, and is directed to providing a technique that allows the print processing performed by the printing apparatus to be interrupted according to an instruction from the post-processing apparatus that performs the post-processing on the product printed by the image forming apparatus.

According to an aspect of the present disclosure, a system includes a printing apparatus, and a post-processing apparatus, wherein the post-processing apparatus includes: a post-processing unit configured to perform post-processing on a product printed by the printing apparatus, and a transmission unit configured to transmit, to the printing apparatus, instruction information instructing the printing apparatus to perform print processing for a first job preferentially, and wherein the printing apparatus includes: a printing unit, a reception unit configured to receive, from the post-processing apparatus, the instruction information instructing the printing apparatus to perform the print processing for the first job preferentially, and a control unit configured to perform control in such a manner that the printing apparatus performs the print processing for the first job preferentially over print processing for a second job, based on the instruction information.

According to other aspects of the present disclosure, one or more additional systems, one or more printing apparatuses, one or more methods for controlling same, one or more post-processing apparatuses, one or more methods for controlling same and one or more storage mediums are discussed herein. Further features of the present disclosure will become apparent from the following description of exemplary embodiments with reference to the attached drawings.

BRIEF DESCRIPTION OF THE DRAWINGS

FIGS. 1A and 1B are diagrams each illustrating a system configuration of an information processing system according to an exemplary embodiment of the present disclosure.

FIG. 5A is a block diagram illustrating a software configuration of the image forming apparatus according to the present exemplary embodiment, and FIG. 5B is a block diagram illustrating a software configuration of the post-processing apparatus according to the present exemplary embodiment.

FIGS. 6A, 6B (consisting of FIGS. 6B1 and 6B2), 6C, and 6D are diagrams illustrating examples of commands (messages) generated by the information processing system according to the present exemplary embodiment.

FIGS. 8A and 8B each illustrate a flow of processing performed by the post-processing apparatus according to the present exemplary embodiment.

FIGS. 9A and 9B each illustrate a flow of processing performed by the image forming apparatus according to the present exemplary embodiment.

FIGS. 10A, 10B, and 10C are diagrams each illustrating an example of a job ticket or a command (a message) generated by the information processing system according to the present exemplary embodiment.

FIGS. 11A and 11B are diagrams each illustrating an example of a screen that is a user interface displayed by the post-processing apparatus according to the present exemplary embodiment.

DESCRIPTION OF THE EMBODIMENTS

Figure 2:
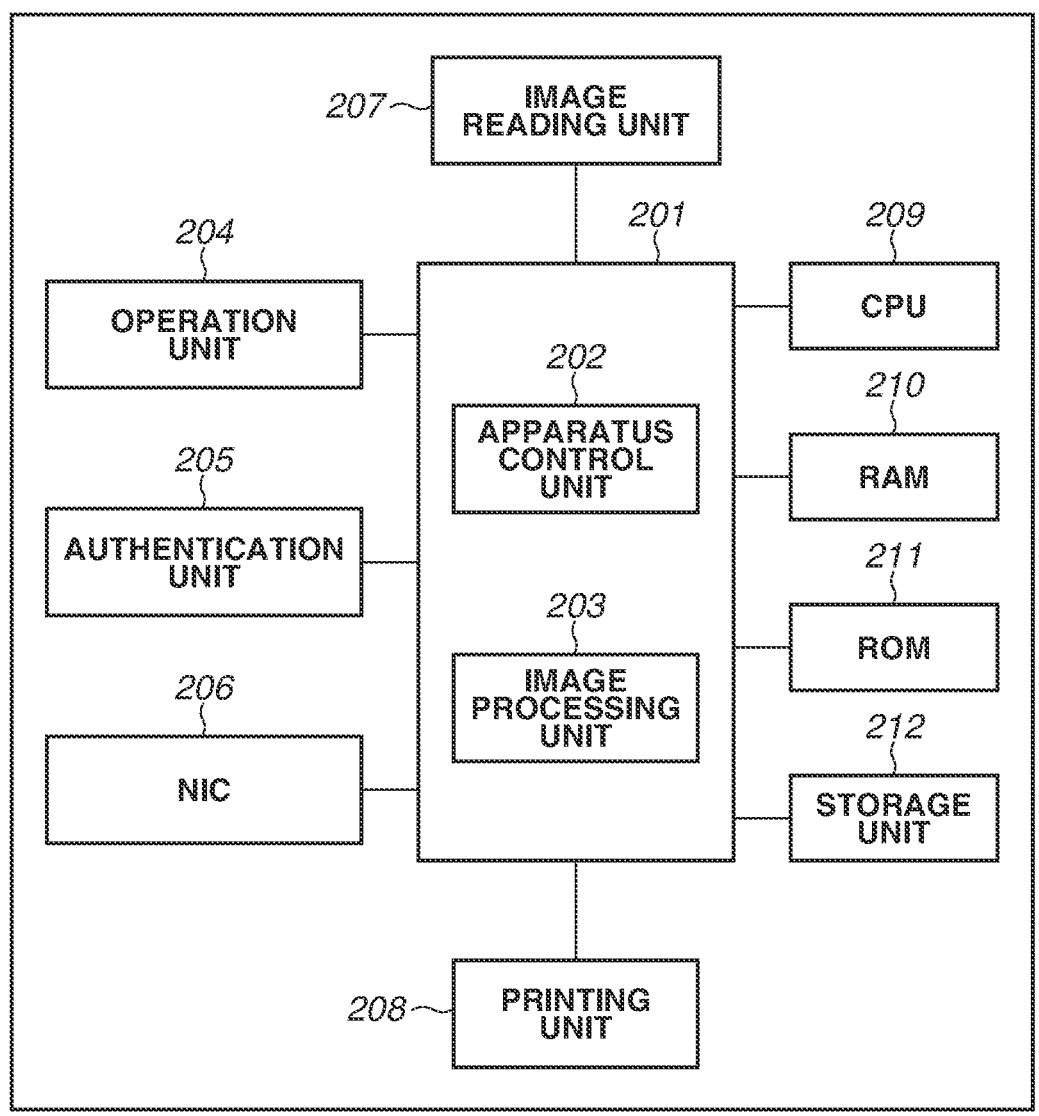
FIG. 2 is a block diagram illustrating a hardware configuration of an image forming apparatus according to the present exemplary embodiment.

In the following description, exemplary embodiments for the present disclosure will be described with reference to the drawings.

FIG. 1A illustrates an overall configuration of an information processing system according to an exemplary embodiment of the present disclosure. An environment of the entire information processing system, which will be described in the following description, is merely an example for facilitating understanding of the present disclosure, and the present disclosure is not limited to this environment.

In FIG. 1A, an image forming apparatus 101, a post-processing apparatus 102, and an information processing apparatus 103 are connected to a network 100. The image forming apparatus 101 analyzes print data including print character data transmitted from the information processing apparatus 103 or the like, converts the print data into a dot image page by page, and prints the print data. Further, the image forming apparatus 101 communicates with the post-processing apparatus 102 via the network 100 to transmit and receive control information and the like thereto and therefrom. A print product output from the image forming apparatus 101 is transferred to the post-processing apparatus 102 by being carried manually by a print operator, or is transferred to the post-processing apparatus 102 via a not-illustrated conveyor belt. The post-processing apparatus 102 performs post-processing (after processing), such as cutting, bookbinding, and folding, on the printout output from the image forming apparatus 101. The post-processing apparatus 102 is a post-processing apparatus of which medium conveyance system is not connected to a medium conveyance system of the image forming apparatus 101 but is capable of communicating with the image forming apparatus 101 and the information processing apparatus 103 via the network 100. Examples of a configuration of the post-processing apparatus 102 include a configuration that individually processes each print product output from the image forming apparatus 101, and a configuration that combines jobs from a plurality of image forming apparatuses 101 to process them as a single product. For example, there is a cutting apparatus as an example of the configuration that individually processes each print product output from the image forming apparatus 101. For example, there is a case binding apparatus (a print product output from an image forming apparatus A is a front cover and a print product output from an image forming apparatus B is a body, and the case binding apparatus produces a single case-binding product therefrom) as an example of the configuration that combines jobs from the plurality of image forming apparatuses 101 to process them as a single product. A program such as a workflow management program and a web server runs on the information processing apparatus 103. Further, a printer driver program or the like, which is used for connecting the image forming apparatus 101 with the post-processing apparatus 102 via the network 100 and controlling the image forming apparatus 101, is installed in the information processing apparatus 103. FIG. 1A illustrates the information processing system as including a signal apparatus as each of the image forming apparatus 101, the post-processing apparatus 102, and the information processing apparatus 103, but the information processing system may include a plurality of apparatuses as each of them.

Especially, in a case where the information processing system includes a plurality of post-processing apparatuses 102, the post-processing apparatuses 102 may be connected to each other, and a product post-processed by one of the post-processing apparatuses 102 may be transferred to the other of the post-processing apparatuses 102. For example, the print product output from the image forming apparatus 101 is subjected to the bookbinding processing performed by the post-processing apparatus 102, and then the cutting processing performed by the other post-processing apparatus 102 after that. Alternatively, the information processing system may not include the information processing apparatus 103. Further, the network 100 may be the Internet, and for example, the information processing system may be configured in such a manner that the information processing apparatus 103 has Internet access to the image forming apparatus 101 and the post-processing apparatus 102. The image forming apparatus 101 is a printing apparatus, and the post-processing apparatus 102 is a print product processing apparatus.

In a first exemplary embodiment, the print product (a medium or information) transferred from the image forming apparatus 101 to the post-processing apparatus 102, and the processed product (a medium or information) transferred between the post-processing apparatuses 102 will be referred to as a "resource".

FIG. 2 illustrates a hardware configuration of the image forming apparatus 101 according to the present exemplary embodiment. The image forming apparatus 101 includes an operation unit 204, an authentication unit 205, a network interface card (NIC) 206, a central processing unit (CPU) 209, a random access memory (RAM) 210, a read only memory (ROM) 211, a storage unit 212, an image reading unit 207, and a printing unit 208, which are connected to one another via a control unit 201. The control unit 201 includes an apparatus control unit 202, which controls the entire image forming apparatus 101, and an image processing unit 203, which processes image data. The operation unit 204 includes, for example, a software keyboard, a touch panel, and/or another input/output device, and can input and display various kinds of setting values. The CPU 209 executes a program stored in the ROM 211, and a program loaded from the storage unit 212 into the RAM 210, such as an application. In other words, the CPU 209 functions as each of processing units for performing processing illustrated in each of flowcharts that will be described below, by executing the program stored in a readable storage medium. The RAM 210 is a main memory of the CPU 209, and functions as a work area and the like. The image reading unit 207 includes, for example, a scanner, and can acquire a document image in the form of image data by reading a paper document or the like. The control unit 201 performs processing for providing a document image stored in the storage unit 212 to the operation unit 204 to output the document image onto the operation unit 204. Further, similarly, the control unit 201 provides the document image stored in the storage unit 212 to the printing unit 208, and the printing unit 208 performs processing for outputting the document image in various forms. For example, the printing unit 208 can perform processing for outputting image data regarding the document image into a storage medium. Alternatively, the printing unit 208 may perform processing for outputting the document image onto an output medium such as a paper medium, as the printing unit 208 has a printing function. Further, the image forming apparatus 101 is capable of connecting to the network 100 via the NIC 206, and transmitting and receiving data. The data acquired via the NIC 206 can also be displayed on the operation unit 204.

Figure 3:
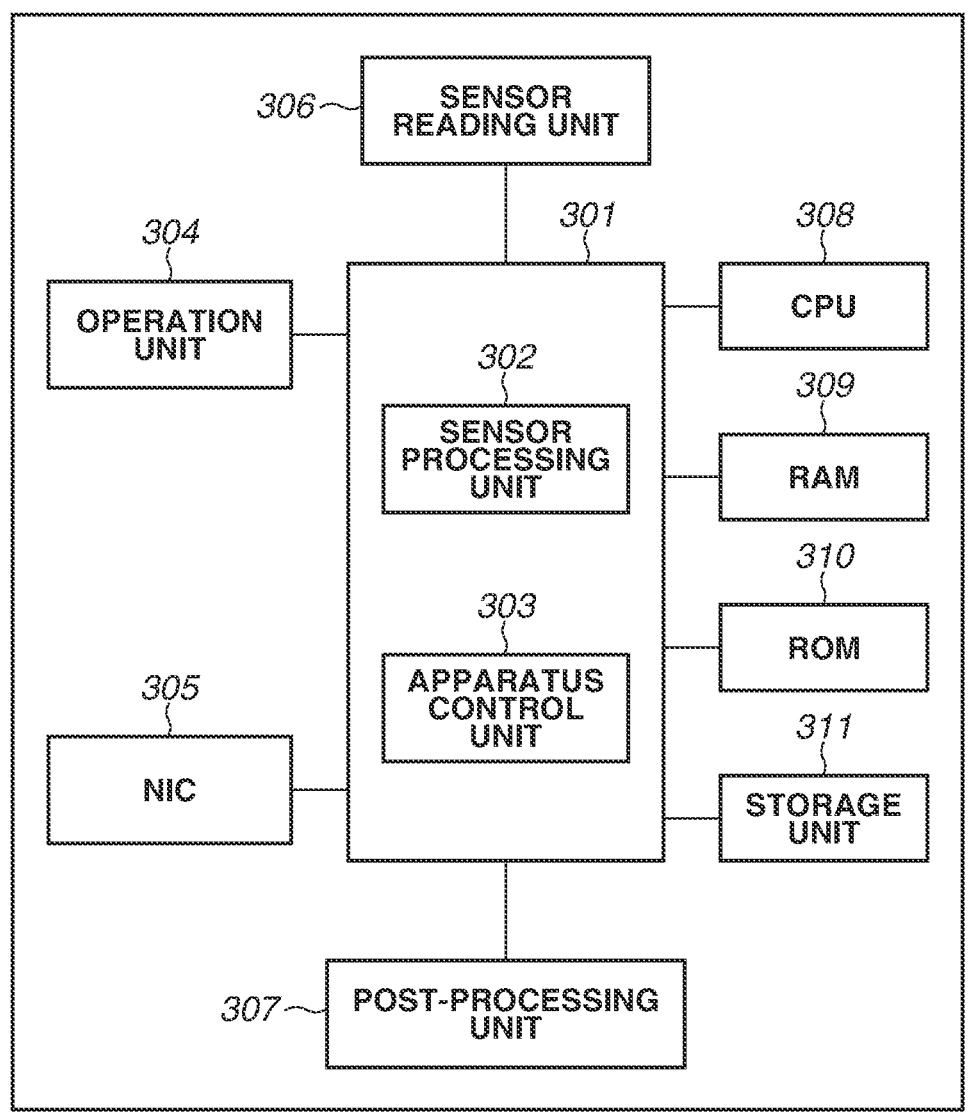
FIG. 3 is a block diagram illustrating a hardware configuration of a post-processing apparatus according to the present exemplary embodiment.

FIG. 3 illustrates a hardware configuration of the post-processing apparatus 102 according to the present exemplary embodiment. The post-processing apparatus 102 includes an operation unit 304, an NIC 305, a CPU 308, a RAM 309, a ROM 310, a storage unit 311, a sensor reading unit 306, and a post-processing unit 307, which are connected to one another via a control unit 301. The control unit 301 includes a sensor processing unit 302, which processes sensor information read by the sensor reading unit 306, and an apparatus control unit 303, which controls the entire post-processing apparatus 102. The operation unit 304 includes, for example, a software keyboard, a touch panel, and/or another input/output device, and can input and display various kinds of setting values. The CPU 308 executes a program stored in the ROM 310, and a program loaded from the storage unit 311 into the RAM 309, such as an application. In other words, the CPU 308 functions as each of processing units for performing the processing illustrated in each of the flowcharts that will be described below, by executing the program stored in a readable storage medium. The RAM 309 is a main memory of the CPU 308, and functions as a work area and the like. The sensor reading unit 306 can read job information (for example, for checking a combination of a front cover and a body of a case binding job) of the print product that is a post-processing target, and the like via a device such as a camera. The control unit 301 performs processing for providing post-processing information stored in the storage unit 311 to the operation unit 304 to output information indicating a setting of the post-processing onto the operation unit 304. Further, similarly, the control unit 301 provides the post-processing information stored in the storage unit 311 to the post-processing unit 307, and the post-processing unit 307 performs the post-processing in various forms. Further, the post-processing apparatus 102 is capable of connecting to the network 100 via the NIC 305, and transmitting and receiving data. The data acquired via the NIC 305 can also be displayed on the operation unit 304.

Figure 4:
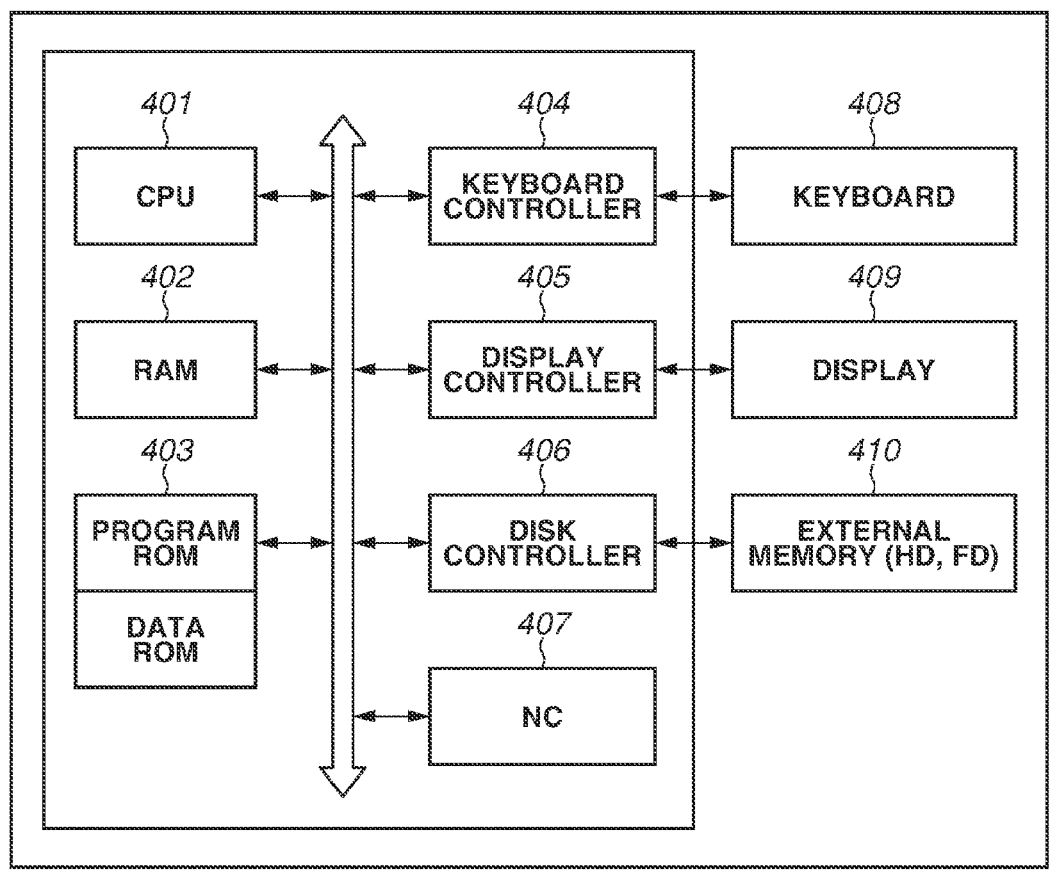
FIG. 4 is a block diagram illustrating a hardware configuration of an information processing apparatus according to the present exemplary embodiment.

FIG. 4 illustrates a hardware configuration of the information processing apparatus 103 according to the present exemplary embodiment. The information processing apparatus 103 can be constructed with use of hardware of a commonly-used computer (a personal computer (PC)). In FIG. 4, a CPU 401 executes a program stored in a program ROM in a ROM 403, and a program loaded from a hard disk 410 into a RAM 402, such as an operating system (OS) and an application.

In other words, the CPU 401 functions as each of processing units for performing the processing illustrated in each of the flowcharts that will be described below, by executing this program stored in a readable storage medium. The RAM 402 is a main memory of the CPU 401, and functions as a work area and the like. A keyboard controller 404 controls an operation input from a keyboard 408 or a not-illustrated pointing device (a mouse, a touch pad, a touch panel, a trackball, or the like). A display controller 405 controls what is displayed on a display 409. A disk controller 406 controls data access to an external memory 410 storing various kinds of data, such as a hard disk (HD) and a flexible disk (FD). A network controller (NC) 407 is connected to the network 100, and performs processing for controlling communication with another apparatus connected to the network 100.

FIG. 5A is a functional block diagram illustrating each of functions of the image forming apparatus 101. A device control unit 5101 controls print processing performed by an image forming unit 5108 according to a print instruction from a job control unit 5102. The job control unit 5102 performs control regarding processing a print job. More specifically, the job control unit 5102 instructs the device control unit 5101 regarding the print processing and transmits a command regarding the post-processing to the post-processing apparatus 102 based on print job information stored in a job information storage unit 5107 and a command received from the post-processing apparatus 102. A command analysis unit 5103 analyzes a command (a command such as commands illustrated in FIGS. 6A to 6D and 10A to 10C, which will be described below) received from the post-processing apparatus 102 or the information processing apparatus 103. A command generation unit 5104 generates a command (a command such as the commands illustrated in FIGS. 6A to 6D and 10A to 10C, which will be described below) to be transmitted to the post-processing apparatus 102 or the information processing apparatus 103. A communication processing unit 5105 carries out data communication with the post-processing apparatus 102 and the information processing apparatus 103. A job information management unit 5106 manages the print job information stored in the job information storage unit 5107. The job information storage unit 5107 stores the information regarding the print job, based on which the image forming apparatus 101 performs the print processing. The job information storage unit 5107 stores a not-illustrated list of print jobs in the image forming apparatus 101, and print setting information, image data, and the like. Each piece of print setting information, image data, and the like is associated with the corresponding print job. The image forming unit 5108 is a processing mechanism that performs the print processing. A job update unit 5109 updates the print setting information and the image data of the print job stored in the job information storage unit 5107 according to an instruction input via the operation unit 204 of the image forming apparatus 101 or from the post-processing apparatus 102 or the information processing apparatus 103.

FIG. 5B is a functional block diagram illustrating each of functions of the post-processing apparatus 102. A communication processing unit 5201 carries out data communication with the image forming apparatus 101 and the information processing apparatus 103. A command analysis unit 5202 analyzes a command (a command such as the commands illustrated in FIGS. 6A to 6D and 10A to 10C, which will be described below) received from the image forming apparatus 101 or the information processing apparatus 103. A command generation unit 5203 generates a command (a command such as the commands illustrated in FIGS. 6A to 6D and 10A to 10C, which will be described below) to be transmitted to the image forming apparatus 101 or the information processing apparatus 103. A job control unit 5204 performs control regarding processing a post-processing job for which the post-processing apparatus 102 performs the post-processing. More specifically, the job control unit 5204 issues an instruction regarding the post-processing to a device control unit 5205 and transmits a command regarding the print processing to the image forming apparatus 101 based on information about the post-processing job stored in a job information storage unit 5206 and the command received from the image forming apparatus 101. The device control unit 5205 controls post-processing performed by a post-processing unit 5208 according to the post-processing instruction from the job control unit 5204. The job information storage unit 5206 stores the information regarding the post-processing job, based on which the post-processing apparatus 102 performs the post-processing. The information about the post-processing also includes a list of post-processing jobs in the post-processing apparatus 102, and instruction information indicating what kind of post-processing should be performed for each job. For example, if the post-processing is set for the case binding, the information about the post-processing includes information such as sheet sizes, sheet types, and finishing sizes of the front cover and the body. These pieces of information are received from the information processing apparatus 103 or the like in advance, or input by the operator from the operation unit 304 of the post-processing apparatus 102. A job information management unit 5207 manages the information about the post-processing job stored in the job information storage unit 5206. The post-processing unit 5208 is a processing mechanism that performs the post-processing.

FIGS. 6A and 6B (consisting of FIGS. 6B1 and 6B2) are diagrams illustrating examples of formats of the commands (the messages) generated by the command generation unit 5104 of the image forming apparatus 101 and the command generation unit 5203 of the post-processing apparatus 102 in the information processing system according to the present exemplary embodiment. A sequence indicating an exchange of the commands will be described with reference to FIG. 7.

FIG. 6B illustrates commands used for an apparatus to notify a communication partner that the apparatus starts the processing of this apparatus itself, notify the communication partner that the apparatus has started the processing of this apparatus itself, or confirm resuming of the processing of this apparatus itself to the communication partner. In the present exemplary embodiment, these commands will be collectively referred to as an output notification command or a "Push" command. For example, the image forming apparatus 101 can instruct the post-processing apparatus 102 to perform the post-processing on the print product output from the image forming apparatus 101 by transmitting the output notification command to the post-processing apparatus 102.

A command 6200 is an example of the output notification command that is transmitted from the image forming apparatus 101 to the post-processing apparatus 102 for starting communication. Type="PipePush" is written and xsi:type="CommandPipePush" is further written in a portion 62001, which make the command 6200 the output notification command. An identification (ID) of the communication (Pipe) is specified by PipeID="PipeSheet" in a PipeParams element in a portion 62002. However, "PipeSheet" is an example of PipeID, and the ID may be assigned in any manner. The use of PipeID allows the command to be identified as to which communication this command is associated with. After the communication is started, this output notification command is transmitted to the post-processing apparatus 102 every time the image forming apparatus 101 outputs the resource (for example, the print product) to the post-processing apparatus 102.

A command 6201 is an example of the output notification command for notifying the post-processing apparatus 102 that the image forming apparatus 101 has output the resource (for example, the print product). A portion 62011 notifies the post-processing apparatus 102 that the image forming apparatus 101 has output one copy of a body of a thirty-fifth set among seven copies.

A command 6202 is an example of the output notification command that is transmitted from the image forming apparatus 101 to the post-processing apparatus 102 for confirming whether the image forming apparatus 101 is permitted to resume temporarily stopped processing to the post-processing apparatus 102. In a portion 62021, SetIndex="34~-1" is specified in a Part element, by which the command 6202 confirms whether the image forming apparatus 101 is permitted to resume the processing from a thirty-fourth set. In the present example, "−1" means execution of the processing to the last.

A command 6203 is the output notification command for notifying the post-processing apparatus 102 that the image forming apparatus 101 has output the resource (for example, the print product) after resuming the temporarily stopped processing. A portion 62031 indicates that the image forming apparatus 101 has resumed the processing from the thirty-fourth set. The output notification command is transmitted to the post-processing apparatus 102 every time the image forming apparatus 101 outputs the resource.

A command 6204 is the output notification command for notifying the post-processing apparatus 102 that the image forming apparatus 101 outputs the resource for interrupt when the image forming apparatus 101 is instructed to print an interrupt job that should be processed with the highest priority by the post-processing apparatus 102. Information regarding the job that is a target job to be prioritized by interrupting the current job therewith can be specified in a JobInfo element in a portion 62041. An order number, the number of copies, and the number of sheets of the job which interrupts the current job are indicated in OrderID, Copies, and Sheets, respectively. A time (or an estimated time) taken for the image forming apparatus 101 to process the target job is indicated in Duration. As a command after that (after the image forming apparatus 101 has started printing the interrupt job), the post-processing apparatus 102 is notified of a similar command to the output notification command like the commands 6201 to 6203.

FIG. 6A illustrates commands for temporarily stopping the processing performed by the communication partner. In the present exemplary embodiment, such commands will be referred to as a temporary stop command or a "Pause" command. For example, the post-processing apparatus 102 can instruct the image forming apparatus 101 to stop the print processing by transmitting this command (the "Pause" command) to the image forming apparatus 101. In the present exemplary embodiment, the "Pause" command will be described based on the example in which the post-processing apparatus 102 transmits this command (the "Pause" command) to the image forming apparatus 101.

A command 6100 is the temporary stop command that is transmitted from the post-processing apparatus 102 to the image forming apparatus 101 in a case where it is desired to temporarily stop the processing performed by the image forming apparatus 101 because a paper jam has occurred in the post-processing apparatus 102 and the post-processing apparatus 102 cannot perform the post-processing.

Type="PipePause" is written and xsi:type="CommandPipePause" is further written in a portion 61001, which make the command 6100 the temporary stop command. A PipeParams element in a portion 61002 is a parameter in which an instruction to the communication partner is written. Duration="10" and Unit="Minutes" are written as an example of information indicating a period of time during which the processing is temporarily stopped. In other words, this parameter indicates that the image forming apparatus 101 stops the print processing for ten minutes from the temporary stop of the processing until the resuming of the processing. Therefore, upon receiving the temporary stop command 6100, the image forming apparatus 101 temporarily stops the processing, and resumes the processing after ten minutes have elapsed from the temporary stop. Examples of Unit include Seconds, Hours, and Days.

Condition="Waste" and SetIndex="34 35" in a Part element in a portion 61003 notify the image forming apparatus 101 that spoilage is generated at the thirty-fourth set and the thirty-fifth set at the post-processing apparatus 102 due to the occurrence of the paper jam. The spoilage means the print product that becomes unusable as a product.

The temporary stop command 6100 has been described based on the example in which the command includes information indicating the period of time during which the processing is temporarily stopped, but does not have to include the information indicating the period of time during which the processing is temporarily stopped. In such a case, the temporary stop can be released by transmission of a temporary stop release command from the post-processing apparatus 102 when it is desired to release the temporary stop.

A command 6101 is the temporary stop command that is transmitted from the post-processing apparatus 102 to the image forming apparatus 101 for stopping the processing for the job currently in process upon the occurrence of the interrupt job that should be processed with the highest priority. PipeType="Interrupt" is written in a PipeParams element in a portion 61011, by which the command 6101 can indicate that the reason for the temporary stop is the occurrence of the interrupt job. Further, a type of the interrupt can be specified in an InterruptOption element in a portion 61012. In a case where the specified type is Promote="True", the image forming apparatus 101 is instructed to perform the processing in the following manner. First, the image forming apparatus 101 performs the print processing up to the thirty-fourth set and the thirty-fifth set according to SetIndex="34 35" specified in AmountPool written subsequently to Promote="True". Then, the image forming apparatus 101 temporarily stops the print processing (executes the interrupt printing). This element is specified to realize efficient production of the product by specifying a position where the job currently in process should be stopped. For example, in the above-described example, in a case where the thirty-fourth set and the thirty-fifth set are supposed to be delivered to a same destination as the products produced as a thirty-third set and sets before that, performing the interrupt processing after processing the thirty-fourth set and the thirty-fifth set allows the resultant products to be more efficiently sorted. Therefore, as a result, efficiency of the entire processing can be improved. In the present exemplary embodiment, a term "promote" will be used for expressing performing the interrupt processing after performing the processing for the job currently in process by a predetermined amount for the interrupt processing in this manner. In other words, upon receiving a promote instruction, the image forming apparatus 101 performs the processing up to the processing written in the promote instruction, and then performs the interrupt processing as instructed after that.

FIG. 6C illustrates a command for instructing the communication partner to perform the processing (for example, produce the product). In the present exemplary embodiment, this command will be referred to as an output request command or a "Pull" command. For example, the post-processing apparatus 102 can instruct the image forming apparatus 101 to print the print data by transmitting the output request command to the image forming apparatus 101.

A command 6300 is the output request command that is transmitted from the post-processing apparatus 102 to the image forming apparatus 101. Type="PipePull" is written and xsi:type="CommandPipePull" is further written in a portion 63001, which make the command 6300 the output request command.

PipeType="Interrupt" is written in a portion 63002, which indicates that the reason for the output request is the occurrence of the interrupt job. Reason="JobSettings" is written in the portion 63002, which indicates that the interrupt has occurred due to a mistake in a setting of the job. "JobSettings" is set in the Reason element, which allows the image forming apparatus 101 side to recognize that a failure can be avoided by changing the setting of the job according to a content of a JobInfo element, which will be described below. The information regarding the job that is the target job to be prioritized by interrupting the current job therewith can be specified in the JobInfo element in a portion 63003. The order number, a job ID, and a job name of the job to interrupt the current job are indicated in OrderID, JobID, and JobName, respectively, and a number of a print target copy in the job to interrupt the current job is indicated in Copies. Further, sheet information and image shift information in the job to interrupt the current job are indicated in Media and ImageShift, respectively. These pieces of information specify changes in the print settings to improve efficiency of the processing performed by the post-processing apparatus 102, or when a correct product has been unable to be produced. More specifically, Media specifies the same Media setting (a sheet size) as the job that is currently being processed by the post-processing apparatus 102. Then, the image forming apparatus 101 outputs the product with the specified Media setting (the sheet size). Processing the interrupt job in this manner can omit a task of changing a stage (changing the setting) at the post-processing apparatus 102, thereby allowing the processing to be efficiently performed. Further, ImageShift is used for a case where the failure has occurred in the production of the product due to a position of an image as a result of the processing performed by the post-processing apparatus 102. The correct product can be acquired by performing image shift processing on the print job at the image forming apparatus 101 according to a value of ImageShift that is specified by the post-processing apparatus 102. Therefore, another print setting may be indicated to achieve these objects. Further, the command may be transmitted to the information processing apparatus 103 depending on the content of the instruction (in a case where the retry of the processing should be started from the information processing apparatus 103).

FIG. 6D illustrates a command for notifying the communication partner of an end of the communication. In the present exemplary embodiment, this command will be referred to as an end commend or a "Close" command. In the present exemplary embodiment, FIG. 6D illustrates an example in which the image forming apparatus 101 transmits this command to the post-processing apparatus 102. However, the post-processing apparatus 102 can also transmit this command to the image forming apparatus 101. In a command 6400, Type="PipeClose" is written and xsi:type="CommandPipeClose" is further written in a portion 64001, which make the command 6400 the end command. A portion 64002 refers to PipeID="PipeSheet" in a PipeParams element, thereby indicating an end of the communication having PipeSheet as PipeID thereof.

Each of the commands (the messages) illustrated in FIGS. 6A to 6D is merely an example, and the commands may be written by a different method. Further, the image forming apparatus 101 and the post-processing apparatus 102 may exchange the commands therebetween with use of a command (message) other than the commands described herein.

Further, the commands have been described assuming that they are exchanged between the image forming apparatus 101 and the post-processing apparatus 102, but these commands may be exchanged between the image forming apparatus 101 and another apparatus than the post-processing apparatus 102.

Figure 7:
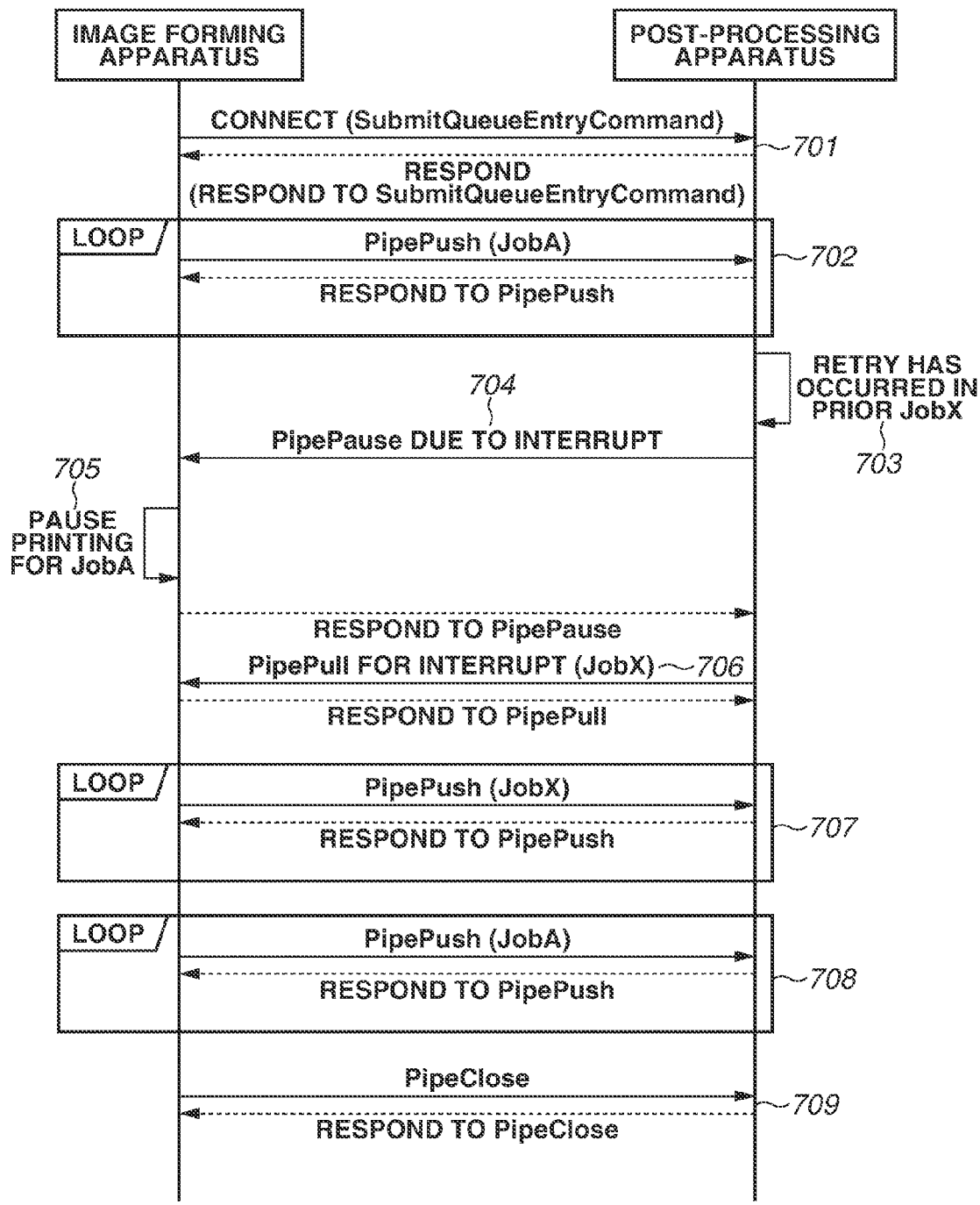
FIG. 7 is an example of a sequence diagram illustrating communication processing in the information processing system according to the present exemplary embodiment.

FIG. 7 is a sequence diagram illustrating an example of a flow of processing in which the image forming apparatus 101 and the post-processing apparatus 102 communicate with each other with use of the commands (the messages) illustrated in FIGS. 6A to 6D in the information processing system according to the present exemplary embodiment. The present sequence indicates a flow in which the post-processing apparatus 102 detects that a failure has occurred in the production of the product for a prior job (referred to as "JobX") in the middle of the post-processing for the job currently in process (referred to as "JobA"), and processes JobX while prioritizing JobX by interrupting JobA therewith.

In FIG. 7, in step 701, the command generation unit 5104 of the image forming apparatus 101 generates a connection command message 1100 illustrated in FIG. 10B for establishing a connection to the post-processing apparatus 102 supposed to perform the post-processing for a target job, and transmits the generated command message 1100 via the communication processing unit 5105, when the image forming apparatus 101 starts the print processing. In FIG. 10B, Type="SubmitQueueEntry" and xsi:type="CommandSubmitQueueEntry" are written in a portion 11001. Further, the command message 1100 illustrated in FIG. 10B refers to a job ticket for the post-processing that is illustrated in FIG. 10A by Uniform Resource Locator (URL) of QueueSubmissionParams in a portion 11002.

FIG. 10A illustrates the job ticket for the post-processing. The job ticket for the post-processing is a job ticket to be used for processing the job by the post-processing apparatus 102. PipeID="PipeSheet" is specified in a Component element in a portion 10001, which leads to establishment of the communication having PipeSheet as the ID thereof. Further, "PipeProtocol="JMFPush" is specified in the Component element in the portion 10001, which can define that the image forming apparatus 101 initializes the communication. Further, a "PipePause" attribute and a "PipeResume" attribute can define predetermined values for determining whether to temporarily stop or resume the communication. More specifically, when the resource reaches the value written in the "PipePause" attribute, the post-processing apparatus 102 transmits the temporary stop command (the "Pause" command) to the image forming apparatus 101. When the resource reaches the value written in the "PipeResume" attribute, the post-processing apparatus 102 transmits the output request command (the Pull" command) to the image forming apparatus 101 as a processing resuming command.

Upon receiving the connection command message 1100, the command analysis unit 5202 of the post-processing apparatus 102 analyzes the received command, and transmits a result thereof (acceptance or rejection of the connection) to the image forming apparatus 101.

A description of processing for analyzing the command will be omitted.

In step 702, the image forming apparatus 101 declares a start of the printing (a start of the output of the resource) by transmitting the output notification command (the "Push" command) indicated by the command 6200 illustrated in FIG. 6B to the post-processing apparatus 102. Upon the start of the print processing at the image forming apparatus 101, the command generation unit 5104 generates the "Push" command (for example, the command 6201 illustrated in FIG. 6B) for each resource on which the post-processing apparatus 102 performs the post-processing, and transmits the generated "Push" command to the post-processing apparatus 102. The post-processing apparatus 102 performs the post-processing on the received resource.

In step 703, the post-processing apparatus 102 detects that a failure has occurred in the production of the product for JobX. In other words, step 703 indicates that a retry of JobX has occurred. The above-described failure is not limited to a failure in the post-processing and also includes a failure in a task after the post-processing (for example, inspection or packing). In step 704, the post-processing apparatus 102 transmits the temporary stop command (the "Pause" command) indicated by the command 6101 illustrated in FIG. 6A to the image forming apparatus 101. As indicated in the portion 61011 in the command 6101, the present command indicates that this is the temporary stop due to the interrupt. In step 705, the image forming apparatus 101 temporarily stops the print processing for JobA, and waits. In a case where Promote="True" is specified in the type of the interrupt which is the portion 61012 as illustrated in FIG. 6A, the image forming apparatus 101 suspends the processing after performing the print processing for JobA up to the specified set (in the example illustrated in FIG. 6A, the image forming apparatus 101 temporarily stops the print processing after completing printing the thirty-fourth set and the thirty-fifth set).

In step 706, the post-processing apparatus 102 transmits the output request command (the "Pull" command) indicated by the command 6300 illustrated in FIG. 6C to the image forming apparatus 101 with respect to JobX to interrupt JobA. In step 707, the image forming apparatus 101 notifies the post-processing apparatus 102 that the image forming apparatus 101 starts the interrupt processing for JobX by transmitting the output notification command (the "Push" command) indicated by the command 6204 illustrated in FIG. 6B to the post-processing apparatus 102. Upon the start of the print processing for JobX at the image forming apparatus 101, the command generation unit 5104 generates the "Push" command for each resource on which the post-processing apparatus 102 performs the post-processing, and transmits the generated "Push" command to the post-processing apparatus 102.

In step 708, upon an end of the print processing for JobX at the image forming apparatus 101, the image forming apparatus 101 resumes the print processing for JobA. The command generation unit 5104 generates the "Push" command with respect to JobA for each resource for which the image forming apparatus 101 performs the print processing, and transmits the generated "Push" command to the post-processing apparatus 102. In step 709, the command generation unit 5104 generates the "Close" command, which indicates that the image forming apparatus 101 ends the current connection because having completed outputting all resources, and transmits the generated "Close" command to the post-processing apparatus 102. More specifically, the image forming apparatus 101 transmits the command 6400 illustrated in FIG. 6D to the post-processing apparatus 102.

Figure 8A:
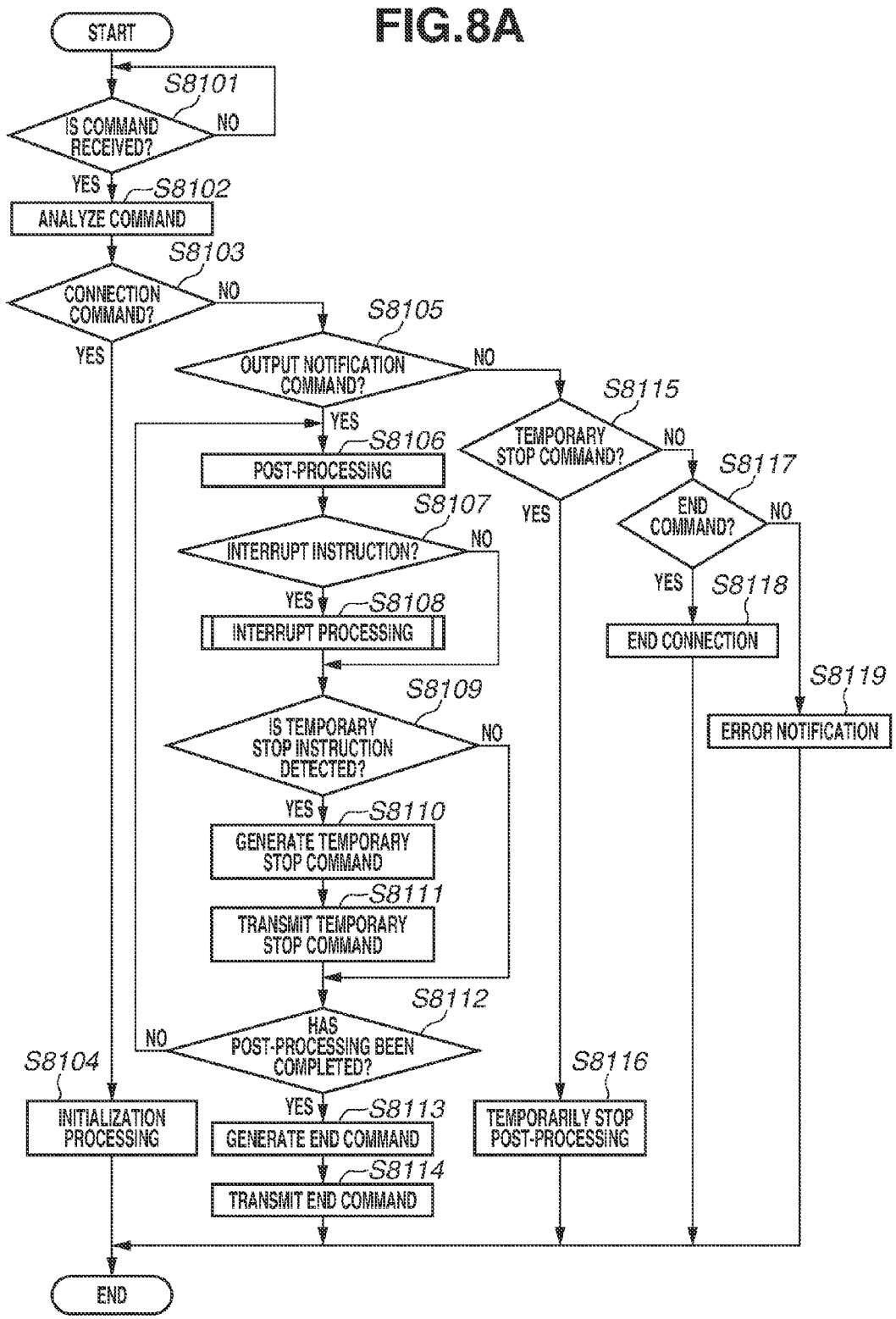

FIG. 8A illustrates a flow from a time of when the post-processing apparatus 102 according to the present exemplary embodiment receives the command (the message) from another apparatus (in the following example, the image forming apparatus 101) until a time of when the post-processing apparatus 102 performs the processing according to the command. The program regarding each flow is stored in the storage unit 311 of the post-processing apparatus 102, and is read into the RAM 309 to be executed by the CPU 308.

In step S8101, the communication processing unit 5201 determines whether the command (the message) is received. In a case where the communication processing unit 5201 determines that the command is received (YES in step S8101), the processing proceeds to step S8102. In step S8102, the command analysis unit 5202 analyzes the received command (the message).

In step S8103, the command analysis unit 5202 determines whether the analyzed command is the connection command message 1100 illustrated in FIG. 10B. In a case where the command analysis unit 5202 determines that the analyzed command is the connection command message 1100 (YES in step S8103), the processing proceeds to step S8104. In a case where the command analysis unit 5202 determines that the analyzed command is not the connection command 1100 (NO in step S8103), the processing proceeds to step S8105. In step S8104, the communication processing unit 5201 performs initialization processing for the communication with the image forming apparatus 101. For example, the communication processing unit 5201 secures a memory (an area in the RAM 309) for the communication, generates a queue for receiving the job, registers the job information, and establishes a session for the communication. As the establishment of the session for the communication, the communication processing unit 5201 establishes the communication based on PipeID written in the connection command message 1100. More specifically, the communication processing unit 5201 acquires PipeID="PipeSheet" in the Component element illustrated in FIG. 10A, generates the connection having "PipeSheet" as the ID thereof, and initializes a socket for the communication with the image forming apparatus 101.

In step S8105, the command analysis unit 5202 determines whether the analyzed command is the output notification command (the "Push" command). In a case where the command analysis unit 5202 determines that the analyzed command is the output notification command (YES in step S8105), the processing proceeds to step S8106. In a case where the command analysis unit 5202 determines that the analyzed command is not the output notification command (NO in step S8105), the processing proceeds to step S8115. In step S8106, the job control unit 5204 causes the post-processing unit 5208 to perform the post-processing on the resource received from the image forming apparatus 101 by instructing the device control unit 5205.

In step S8107, the job control unit 5204 determines whether the interrupt processing has occurred. The job control unit 5204 determines that the interrupt has occurred in a manner such that the device control unit 5205 automatically detects an error in the post-processing apparatus 102 and the post-processing apparatus 102 is instructed to execute the interrupt from a screen illustrated in FIG. 11A. Further, the post-processing apparatus 102 may also be configured in such a manner that occurrence of the interrupt is determined in a case where the interrupt instruction is received from a user via the operation unit 304 of the post-processing apparatus 102, independently of the automatic detection. The interrupt in the present exemplary embodiment is carried out for a reason such as a retry due to a failure in the processing for the prior job. In a case where the job control unit 5204 determines that the interrupt has occurred (YES in step S8107), the processing proceeds to step S8108. In a case where the job control unit 5204 determines that the interrupt has not occurred (NO in step S8107), the processing proceeds to step S8109. In step S8108, the job control unit 5204 performs the interrupt processing illustrated in FIG. 8B, which will be described below.

In step S8109, the job control unit 5204 determines whether an instruction for the temporary stop is detected. Examples of a condition for the temporary stop include the following three conditions. The temporary stop is requested when the number of resources acquired from the image forming apparatus 101 exceeds a threshold value indicated in "PipePause" illustrated in FIG. 10A, when the device control unit 5205 detects an error in the post-processing unit 5208, or when an input of a stop command from the operation unit 304 is detected. In a case where the job control unit 5204 determines that the instruction for the temporary stop is detected (YES in step S8109), the processing proceeds to step S8110. In a case where the job control unit 5204 determines that the instruction for the temporary stop is not detected (NO in step S8109), the processing proceeds to step S8112. In step S8110, the command generation unit 5203 generates the temporary stop command (the "Pause" command). In the present exemplary embodiment, the temporary stop command includes the information indicating the period of time during which the processing is temporarily stopped. Therefore, the apparatus that has received the temporary stop command is set to resume the processing after the time for the temporary stop has elapsed. In step S8111, the communication processing unit 5201 transmits the temporary stop command generated in step S8110 to the apparatus to which the post-processing apparatus 102 is currently connected (the image forming apparatus 101). In step S8112, the job control unit 5204 determines whether all post-processing procedures have been completed. In a case where the job control unit 5204 determines that the all post-processing procedures have been completed (YES in step S8112), the processing proceeds to step S8113. In a case where the job control unit 5204 determines that the all post-processing procedures have not been completed (NO in step S8112), the processing proceeds to step S8106. Then, the post-processing apparatus 102 continuously performs the post-processing. In step S8113, the command generation unit 5203 generates the end command (the "Close" command). In step S8114, the communication processing unit 5201 transmits the end command generated in step S8113 to the apparatus to which the post-processing apparatus 102 is currently connected (the image forming apparatus 101).

In step S8115, the command analysis unit 5202 determines whether the analyzed command is the temporary stop command (the "Pause" command). In a case where the command analysis unit 5202 determines that the analyzed command is the temporary stop command (YES in step S8115), the processing proceeds to step S8116. In a case where the command analysis unit 5202 determines that the analyzed command is not the temporary stop command (NO in step S8115), the processing proceeds to step S8117. In step S8116, the job control unit 5204 instructs the device control unit 5205 to temporarily stop the post-processing on the resource for which the instruction is received, thereby causing the post-processing unit 5208 to stop the post-processing.

In step S8117, the command analysis unit 5202 determines whether the analyzed command is the end command (the "Close" command). In a case where the command analysis unit 5202 determines that the analyzed command is the end command (YES in step S8117), the processing proceeds to step S8118. In a case where the command analysis unit 5202 determines that the analyzed command is not the end command (NO in step S8117), the processing proceeds to step S8119. In step S8118, the communication processing unit 5201 ends the connection with the apparatus to which the post-processing apparatus 102 is currently connected. Further, the job control unit 5204 waits for an end of the post-processing performed by the post-processing unit 5208. Upon the end of the post-processing, the job control unit 5204 notifies the device control unit 5205 of the end of the post-processing, and deletes the job (resource) information from the job information storage unit 5206. In step S8119, the apparatus to which the post-processing apparatus 102 is currently connected (the image forming apparatus 101) is notified that the command analysis unit 5202 has failed in the analysis via the communication processing unit 5201.

FIG. 8B illustrates a flow of the interrupt processing performed in step S8108 illustrated in FIG. 8A. The program regarding each flow is stored in the storage unit 311 of the post-processing apparatus 102, and is read into the RAM 309 to be executed by the CPU 308.

In step S8201, the job control unit 5204 displays a screen 1200 for inputting the cause and conditions for the interrupt, such as the screen illustrated in FIG. 11A, via the operation unit 304.

In the screen 1200 illustrated in FIG. 11A, a control 12001 is used for inputting a location where the failure has occurred and a character string indicating the cause, as the cause for the failure in the post-processing. The location where the failure has occurred is a location where the processing causing the failure has been performed, i.e., the post-processing apparatus 102 is instructed that the processing should be performed again, from the specified location, by which the target apparatus is notified. A control 12002 is used for specifying whether to perform the interrupt processing on the job currently in process. In a case where the execution of the interrupt processing is specified, the promote setting can be further specified. The example illustrated in FIG. 11A indicates that the interrupt processing is performed after the processing is completed for the thirty-fourth set and the thirty-fifth set in the job currently in process. A control 12003 is used for specifying the sheet setting in such a manner that the sheet size matches the sheet size of the job currently in process when the product for the failed job is reproduced. For example, the image forming apparatus 101 is notified of this instruction, which causes the print processing to be performed from the image forming apparatus 101 with use of the same sheet as the current job, whereby inconvenience of changing the stage can be reduced (changing the setting) due to a change in the sheet size. A control 12004 is used for changing the setting of the job when the product for the failed job is reproduced. For example, the image forming apparatus 101 is notified of this instruction, which causes the image forming apparatus 101 to perform the print processing according to the specified print setting. In other words, the present instruction can be used as a recovery from the failure.

In step S8202, the command generation unit 5203 generates the temporary stop command (the "Pause" command). In this case, the temporary stop command includes the information instructing execution of the interrupt processing (the portions 61011 and 61012 illustrated in FIG. 6A). In step S8203, the communication processing unit 5201 transmits the temporary stop command generated in step S8202 to the image forming apparatus 101.

In step S8204, the job control unit 5204 determines whether the promote setting is specified in the interrupt conditions input in step S8201. In a case where the job control unit 5204 determines that the promote setting is specified (YES in step S8204), the processing proceeds to step S8205. In a case where the job control unit 5204 determines that the promote setting is not specified (NO in step S8204), the processing proceeds to step S8206. In step S8205, the job control unit 5204 causes the post-processing unit 5208 to perform the post-processing up to the set indicated in the specified promote setting, via the device control unit 5205 (in the example illustrated in FIG. 11A, the post-processing unit 5208 performs up to the post-processing of the thirty-fourth set and the thirty-fifth set).

In step S8206, the job control unit 5204 determines whether the processing with use of the same sheet is specified as the specified sheet input in step S8201. In a case where the job control unit 5204 determines that the processing with use of the same sheet is specified (YES in step S8206), the processing proceeds to step S8207. In a case where the job control unit 5204 determines that the processing with use of the same sheet is not specified (NO in step S8206), the processing proceeds to step S8208. In step S8207, the job control unit 5204 acquires the sheet information about the resource that is being currently processed by the post-processing unit 5208 (the resource to be interrupted) based on the job information stored in the job information storage unit 5206.

In step S8208, the command generation unit 5203 generates the output request command (the "Pull" command) to be transmitted to the image forming apparatus 101. The generated output request command includes the information indicating the interrupt (PipeType="Interrupt" illustrated in FIG. 6C). In this process, the command generation unit 5203 sets the sheet information acquired in step S8207 into the command. In other words, the post-processing apparatus 102 instructs the image forming apparatus 101 to set the output sheet about the job to be prioritized by interrupting the job currently in process in such a manner that this output sheet matches the job currently in process (the original job to be interrupted). Further, the command generation unit 5203 sets the cause input in step S8201 (the content of the change in the job) (for example, the information such as the image shift ("ImageShift") indicated in the portion 63003 illustrated in FIG. 6C). In other words, the post-processing apparatus 102 instructs the image forming apparatus 101 to correct the print setting so as to prevent a similar failure from occurring. In step S8209, the communication processing unit 5201 transmits the output request command ("Pull" illustrated in FIG. 6C) generated in step S8208 to the image forming apparatus 101.

In step S8210, the job control unit 5204 determines whether the cause for the failure input in step S8201 is the post-processing apparatus 102 (for example, an operation mistake). In a case where the job control unit 5204 determines that the cause for the failure is the post-processing apparatus 102 (YES in step S8210), the processing proceeds to step S8211. In a case where the job control unit 5204 determines that the cause for the failure is not the post-processing apparatus 102 (NO in step S8210), the processing proceeds to step S8212. In step S8211, the job control unit 5204 displays a warning screen (not illustrated) via the operation unit 304. For example, the job control unit 5204 displays the character string input in "CAUSE" in the control 12001 illustrated in FIG. 11A. In other words, the job control unit 5204 displays a warning before the post-processing apparatus 102 starts the post-processing so that a similar failure should not occur.

In step S8212, the job control unit 5204 instructs the device control unit 5205 to perform the post-processing on the resource for the interrupt processing, which is received from the image forming apparatus 101, thereby causing the post-processing unit 5208 to perform the post-processing. In step S8213, the job control unit 5204 determines whether the post-processing apparatus 102 has completed the post-processing on all interrupt jobs. In a case where the job control unit 5204 determines that the post-processing apparatus 102 has completed the post-processing on the all interrupt jobs (YES in step S8213), the processing proceeds to step S8214. In a case where the job control unit 5204 determines that the post-processing apparatus 102 has not completed the post-processing on the all interrupt jobs (NO in step S8213), the processing proceeds to step S8212. Then, the post-processing apparatus 102 continuously performs the post-processing.

In step S8214, the command generation unit 5203 generates the output request command (the "Pull" command) with respect to the resource that is the interrupted original. In step S8215, the communication processing unit 5201 transmits the output request command generated in step S8214 to the image forming apparatus 101.

FIG. 9A illustrates a flow from a time of when the image forming apparatus 101 according to the present exemplary embodiment starts the print processing until a time of when the image forming apparatus 101 ends the print processing. The following example will be described based on the configuration in which the image forming apparatus 101 is connected to the post-processing apparatus 102, by way of example. The program regarding each flow is stored in the storage unit 212 of the image forming apparatus 101, and is read into the RAM 210 to be executed by the CPU 209.

In step S9101, the job control unit 5102 determines whether the print instruction is received based on reception of the print job from another apparatus (for example, the information processing apparatus 103) via the communication processing unit 5105 or based on an operation input onto the operation unit 204. In a case where the job control unit 5102 determines that the print instruction is received (YES in step S9101), the processing proceeds to step S9102. In step S9102, the job control unit 5102 causes the image forming unit 5108 to start the print processing via the device control unit 5101. The print processing is sequentially performed for each unit of the product (for example, one copy at a time), and the product (the resource) is sequentially transferred to the post-processing apparatus 102.

In step S9103, the command generation unit 5104 generates the output notification command (the "Push" command) for notifying the communication partner that the image forming apparatus 101 has started the print processing. In step S9104, the communication processing unit 5105 transmits the output notification command (the "Push" command) generated in step S9103 to the apparatus that is the communication destination (the post-processing apparatus 102).

In step S9105, the communication processing unit 5105 determines whether the command (the message) is received from another apparatus. In a case where the communication processing unit 5105 determines that the command is received (YES in step S9105), the processing proceeds to step S9106. In a case where the communication processing unit 5105 determines that the command is not received (NO in step S9105), the processing proceeds to step S9107. In step S9106, the communication processing unit 5105 performs processing for receiving the command illustrated in FIG. 9B, which will be described below.

In step S9107, the job control unit 5102 determines whether the image forming apparatus 101 has completed processing all of print jobs for which the instruction has been received (for example, whether the image forming apparatus 101 has completed printing all copies (sets)). In a case where the job control unit 5102 determines that the image forming apparatus 101 has completed processing all of the print jobs (YES in step S9107), the processing proceeds to step S9108. In a case where the job control unit 5102 determines that there is still the print job left to be processed (NO in step S9107), the processing proceeds to step S9103 (for example, the image forming apparatus 101 performs the print processing of a next copy). In step S9108, the command generation unit 5104 generates the end command (the "Close" command), which indicates the end of the processing. In step S9109, the communication processing unit 5105 transmits the end command (the "Close" command) generated in step S9108 to the apparatus that is the communication destination (the post-processing apparatus 102).

Figure 9B:
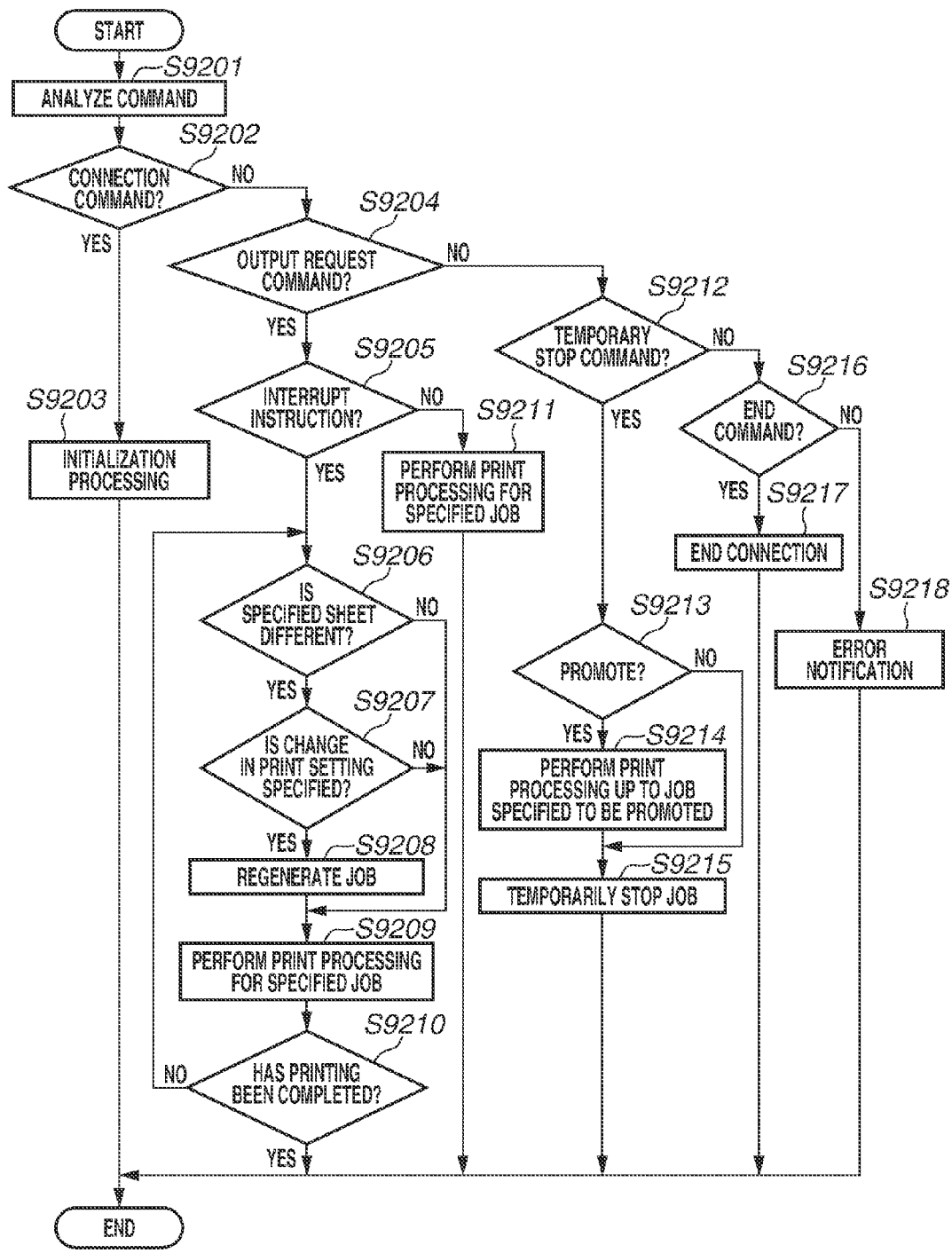

FIG. 9B illustrates a flow of the processing for receiving the command in step S9106 illustrated in FIG. 9A. The program regarding each flow is stored in the storage unit 212 of the image forming apparatus 101, and is read into the RAM 210 to be executed by the CPU 209.

In step S9201, the command analysis unit 5103 analyzes the received command (the message). In step S9202, the command analysis unit 5103 determines whether the analyzed command is the connection command message 1100 illustrated in FIG. 10B. In a case where the command analysis unit 5103 determines that the analyzed command is the connection command 1100 (YES in step S9202), the processing proceeds to step S9203. In a case where the command analysis unit 5103 determines that the analyzed command is not the connection command 1100 (NO in step S9202), the processing proceeds to step S9204. In step S9203, the communication processing unit 5105 performs the initialization processing for the communication with the post-processing apparatus 102. For example, the communication processing unit 5105 secures a memory (an area in the RAM 210) for the communication, generates a queue for receiving the job, registers the job information, and establishes a session for the communication.

In step S9204, the command analysis unit 5103 determines whether the analyzed command is the output request command (the "Pull" command). In a case where the command analysis unit 5103 determines that the analyzed command is the output request command (YES in step S9204), the processing proceeds to step S9205. In a case where the command analysis unit 5103 determines that the analyzed command is not the output request command (NO in step S9204), the processing proceeds to step S9212.

In step S9205, the command analysis unit 5103 determines whether the analyzed command includes the interrupt instruction (PipeType="Interrupt" illustrated in FIG. 6C). In a case where the command analysis unit 5103 determines that the analyzed command includes the interrupt instruction (YES in step S9205), the processing proceeds to step S9206. In a case where the command analysis unit 5103 determines that the analyzed command does not include the interrupt instruction (NO in step S9205), the processing proceeds to step S9211. In step S9206, the job control unit 5102 determines whether the sheet information included in the output request command received from the post-processing apparatus 102 is different from the sheet set in the previously output job having the same job ID based on the information acquired from the job information management unit 5106. In a case where the job control unit 5102 determines that they are different from each other (YES in step S9206), the processing proceeds to step S9207. In a case where the job control unit 5102 determines that they are the same as each other (NO in step S9206), the processing proceeds to step S9209.

In step S9207, the job control unit 5102 determines whether the print setting information included in the output request command received from the post-processing apparatus 102 is different from the print setting of the previously output job having the same job ID based on the information acquired from the job information management unit 5106. In a case where the job control unit 5102 determines that they are different from each other (YES in step S9207), the processing proceeds to step S9208. In a case where the job control unit 5102 determines that they are the same as each other (NO in step S9207), the processing proceeds to step S9209. In step S9208, the job update unit 5109 recreates the print job data stored in the job information storage unit 5107 according to the sheet information and the print setting information included in the output request command received from the post-processing apparatus 102, according to the instruction from the job control unit 5102. This update can prevent a reduction in work efficiency due to the change in the stage (the change in the sheet setting) at the post-processing apparatus 102, and avoid a failure in the production of the product due to the print product output from the image forming apparatus 101.

In step S9209, the job control unit 5102 causes the image forming unit 5108 to perform the print processing via the device control unit 5101. In step S9210, the job control unit 5102 determines whether the image forming apparatus 101 has completed processing all of print jobs that are the targets prioritized by interrupting the current job. In a case where the image forming apparatus 101 has completed processing all of the print jobs (YES in step S9210), the processing for receiving the command is ended. If there is still the print jobs left to be processed (NO in step S9210), the processing proceeds to step S9206. In step S9211, the job control unit 5102 instructs the device control unit 5101 to perform the print processing for the print job specified in the output request command, thereby causing the image forming unit 5108 to perform the print processing.

In step S9212, the command analysis unit 5103 determines whether the analyzed command is the temporary stop command (the "Pause" command). In a case where the command analysis unit 5103 determines that the analyzed command is the temporary stop command (YES in step S9212), the processing proceeds to step S9213. In a case where the command analysis unit 5103 determines that the analyzed command is not the temporary stop command (NO in step S9212), the processing proceeds to step S9216.

In step S9213, the command analysis unit 5103 determines whether the analyzed command includes the promote instruction (PipeType="Interrupt" and Promote="True" in the command 6101 illustrated in FIG. 6A). In a case where the command analysis unit 5103 determines that the analyzed command includes the promote instruction (YES in step S9213), the processing proceeds to step S9214. In a case where the command analysis unit 5103 determines that the analyzed command does not include the promote instruction (NO in step S9213), the processing proceeds to step S9215. In step S9214, the job control unit 5102 causes the image forming unit 5108 to perform the print processing up to the set specified in the promote instruction via the device control unit 5101 (in the example illustrated in FIG. 6A, the image forming unit 5108 performs up to the print processing of the thirty-fourth set and the thirty-fifth set). In step S9215, the job control unit 5102 instructs the device control unit 5101 to temporarily stop the print processing, thereby causing the image forming unit 5108 to stop the print processing for the target job.

In step S9216, the command analysis unit 5103 determines whether the analyzed command is the end command (the "Close" command). In a case where the command analysis unit 5103 determines that the analyzed command is the end command (YES in step S9216), the processing proceeds to step S9217. In a case where the command analysis unit 5103 determines that the analyzed command is not the end command (NO in step S9216), the processing proceeds to step S9218. In step S9217, the communication processing unit 5105 ends the connection with the apparatus to which the image forming apparatus 101 is currently connected. Further, the job control unit 5102 waits for the end of the print processing performed by the image forming unit 5108. Upon the end of the print processing, the job control unit 5102 notifies the device control unit 5101 of the end of the print processing, and deletes the job (resource) information from the job information storage unit 5107. In step S9218, the apparatus to which the image forming apparatus 101 is currently connected is notified that the command analysis unit 5103 has failed in the analysis via the communication processing unit 5105.

In the present exemplary embodiment, promoting of a job is executed in such a manner that the interrupt processing for a job is executed after processing up to the specified set in a job currently in process is performed, but may be executed in such a manner that the interrupt processing for a job is executed after processing up to a specified job or specified jobs including the job currently in process is performed.

Further, in the present exemplary embodiment, a failure in the production of the product for the prior job (referred to as "JobX") in the middle of the post-processing for the job currently in process (referred to as "JobA") is detected, and JobX is processed while prioritizing JobX by interrupting JobA therewith. Alternatively, JobX may be a part of JobA.

As described above, even if a job desired to be processed preferentially has occurred in the post-processing apparatus, the post-processing apparatus can cause the information processing apparatus to efficiently perform the interrupt processing.

In the first exemplary embodiment, an exemplary embodiment of the present disclosure has been described as the method for controlling the interrupt regarding the printing of the image forming apparatus from the post-processing apparatus in the configuration including a single image forming apparatus and a single post-processing apparatus.

However, the present disclosure can also be applied to a method for controlling the interrupt regarding the printing from the post-processing apparatus to a plurality of image forming apparatuses in a configuration including the plurality of image forming apparatuses.

In the following description, a second exemplary embodiment will be described as an exemplary embodiment in which the plurality of image forming apparatuses is provided. Detailed differences from the first exemplary embodiment will be described with reference to the drawings.

FIG. 1B illustrates an overall configuration of an information processing system according to the second exemplary embodiment of the present disclosure. The present exemplary embodiment indicates a configuration that includes two image forming apparatuses. More specifically, the present exemplary embodiment includes image forming apparatuses 1301 and 1302. Respective configurations of the image forming apparatuses 1301 and 1302, the post-processing apparatus 102, the information processing apparatus 103, and the network 100 are similar to the first exemplary embodiment, and therefore descriptions thereof will be omitted below. In the following description, the image forming apparatuses 1301 and 1302 may be referred to as the image forming apparatus A and the image forming apparatus B, respectively.

Figure 12:
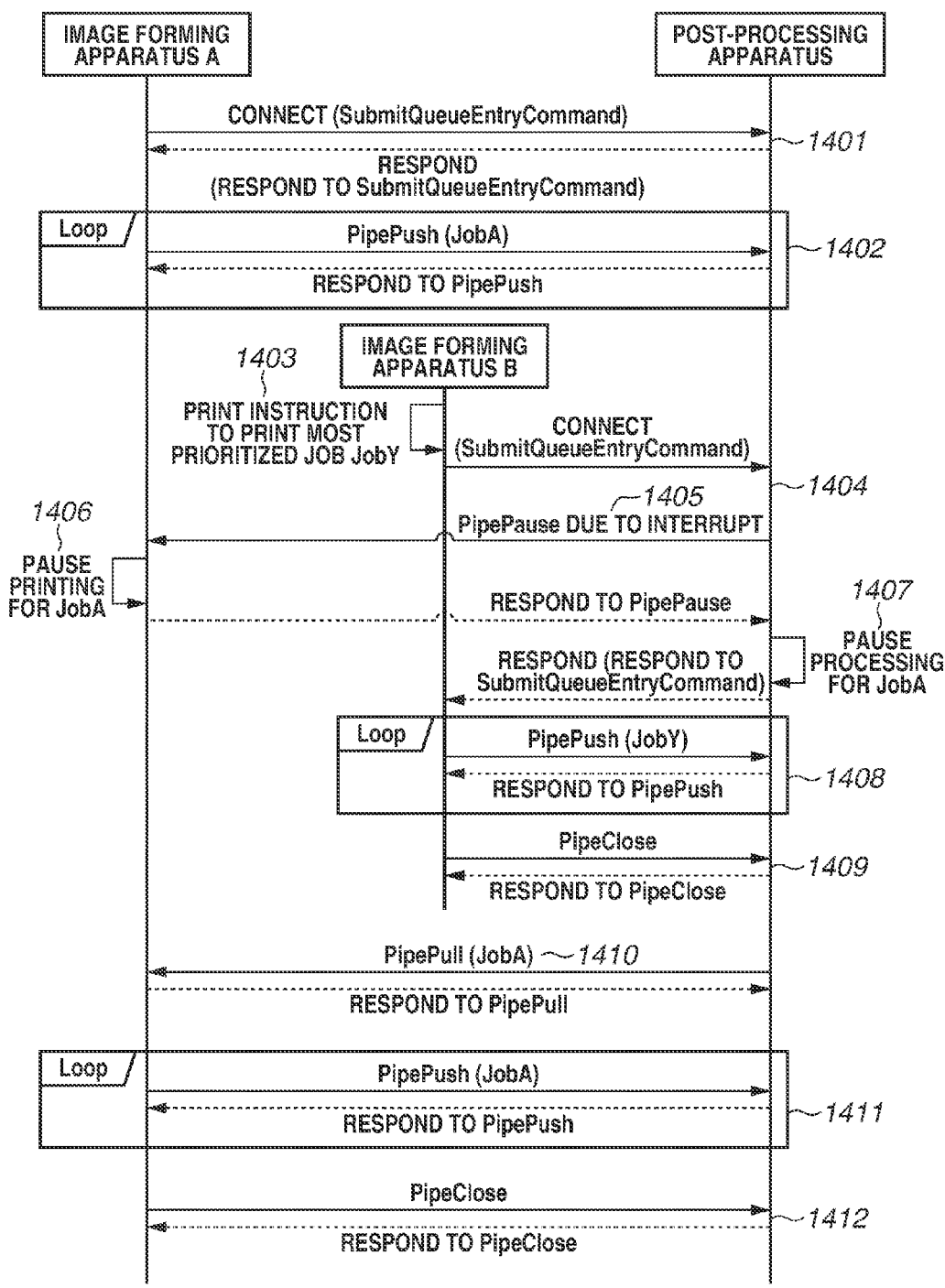
FIG. 12 is an example of a sequence diagram illustrating communication processing in an information processing system according to a second exemplary embodiment.

FIG. 12 is a sequence diagram illustrating an example of a flow of processing in which the image forming apparatuses A and B and the post-processing apparatus 102 communicate with one another in the information processing system according to the present exemplary embodiment.

This is an example in which the information processing system receives a print instruction about a new job (referred to as "JobY") that should be processed preferentially at the image forming apparatus B in the middle of the print processing for the job currently in process (referred to as "JobA") at the image forming apparatus A. Therefore, JobY is processed while JobY is prioritized by interrupting JobA therewith.

In FIG. 12, in step 1401, the command generation unit 5104 of the image forming apparatus A starts the print processing. More specifically, the command generation unit 5104 transmits the connection command message 1100 illustrated in FIG. 10B for establishing a connection to the post-processing apparatus 102 supposed to perform the post-processing for a target job, and the job ticket 1000 illustrated in FIG. 10A via the communication processing unit 5105. FIGS. 10A and 10B are the same as described above, and therefore descriptions thereof will be omitted here. Upon receiving the command, the command analysis unit 5202 of the post-processing apparatus 102 analyzes the received command, and transmits a result thereof (acceptance or rejection of the connection) to the image forming apparatus A.

In step 1402, the image forming apparatus A declares a start of the printing (a start of the output of the resource) by transmitting the output notification command (the "Push" command) indicated by the command 6200 illustrated in FIG. 6B to the post-processing apparatus 102. Upon the start of the print processing at the image forming apparatus A, the command generation unit 5104 generates the "Push" command (for example, the command 6201 illustrated in FIG. 6B) for each resource on which the post-processing apparatus 102 performs the post-processing, and transmits the generated "Push" command to the post-processing apparatus 102. The post-processing apparatus 102 performs the post-processing on the received resource.

In step 1403, the image forming apparatus B receives the print instruction for a job, which is JobY, that should be processed with the highest priority by interrupting a current job. In step 1404, the command generation unit 5104 of the image forming apparatus B starts a connection when the image forming apparatus B starts the print processing. More specifically, the command generation unit 5104 transmits a connection command message 1600 illustrated in FIG. 10C for establishing a connection to the post-processing apparatus 102 supposed to perform the post-processing for the target job (JobY), and the job ticket 1000 illustrated in FIG. 10A via the communication processing unit 5105. In FIG. 10C, Type="SubmitQueueEntry" and xsi:type="CommandSubmitQueueEntry" are written in a portion 16001. Further, this command refers to the job ticket 1000 for the post-processing that is illustrated in FIG. 10A by URL of QueueSubmissionParams in a portion 16002. Further, a "Priority" element is specified in the portion 16002 as priority assigned to processing the job, and Priority="100" indicates that this job is a prioritized job required to be processed with the highest priority. FIG. 10A is the same as described above, and therefore a description thereof will be omitted here. Upon receiving the command, the communication processing unit 5201 of the post-processing apparatus 102 suspends notification of a response to the image forming apparatus B until completion of a preparation for the interrupt (until an end of processing in step 1407). At this stage, the image forming apparatus B does not start the print processing, and waits until receiving the response from the post-processing apparatus 102.

In step 1405, the post-processing apparatus 102 transmits the temporary stop command ("Pause") including the interrupt instruction, which is indicated by the command 6101 illustrated in FIG. 6A, to the image forming apparatus A from which the post-processing apparatus 102 is receiving the job that the post-processing apparatus 102 is currently processing. In step 1406, the image forming apparatus A temporarily stops the print processing for JobA, and waits. In a case where Promote="True" is specified as the type of the interrupt as illustrated in FIG. 6A, the image forming apparatus A suspends the processing after performing the print processing up to the specified set (in the example illustrated in FIG. 6A, the image forming apparatus A suspends the processing after completing printing the thirty-fourth set and the thirty-fifth set).

In step 1407, the post-processing apparatus 102 temporarily stops the post-processing for JobA, and waits. Upon completing the processing for temporarily stopping the post-processing at the post-processing apparatus 102, the post-processing apparatus 102 notifies the image forming apparatus B of the response (acceptance or rejection of the connection) to the command received in step 1404.

In step 1408, the image forming apparatus B starts the print processing for JobY. Then, the command generation unit 5104 of the image forming apparatus B generates the "Push" command, such as the commands indicated by the commands 6201 to 6203 illustrated in FIG. 6B for each resource on which the post-processing apparatus 102 performs the post-processing, and transmits the generated "Push" command to the post-processing apparatus 102. In step 1409, the command generation unit 5104 generates the "Close" command, which indicates that the image forming apparatus B ends the current connection because having completed outputting all resources for JobY, and transmits the generated "Close" command to the post-processing apparatus 102. More specifically, the image forming apparatus B transmits the command 6400 illustrated in FIG. 6D to the post-processing apparatus 102.

In step 1410, the post-processing apparatus 102 requests the image forming apparatus A to resume the print processing for JobA by transmitting the output request command (the "Pull" command), such as the command indicated by the command 6300 illustrated in FIG. 6C to the image forming apparatus A. In step 1411, the image forming apparatus A resumes the print processing for JobA. The command generation unit 5104 generates the "Push" command with respect to JobA for each resource on which the post-processing apparatus 102 performs the post-processing, and transmits the generated "Push" command to the post-processing apparatus 102. In step 1412, the command generation unit 5104 generates the "Close" command, which indicates that the image forming apparatus A ends the current connection because having completed producing all resources, and transmits the generated "Close" command to the post-processing apparatus 102. More specifically, the image forming apparatus A transmits the command 6400 illustrated in FIG. 6D to the post-processing apparatus 102.

Figure 13A:
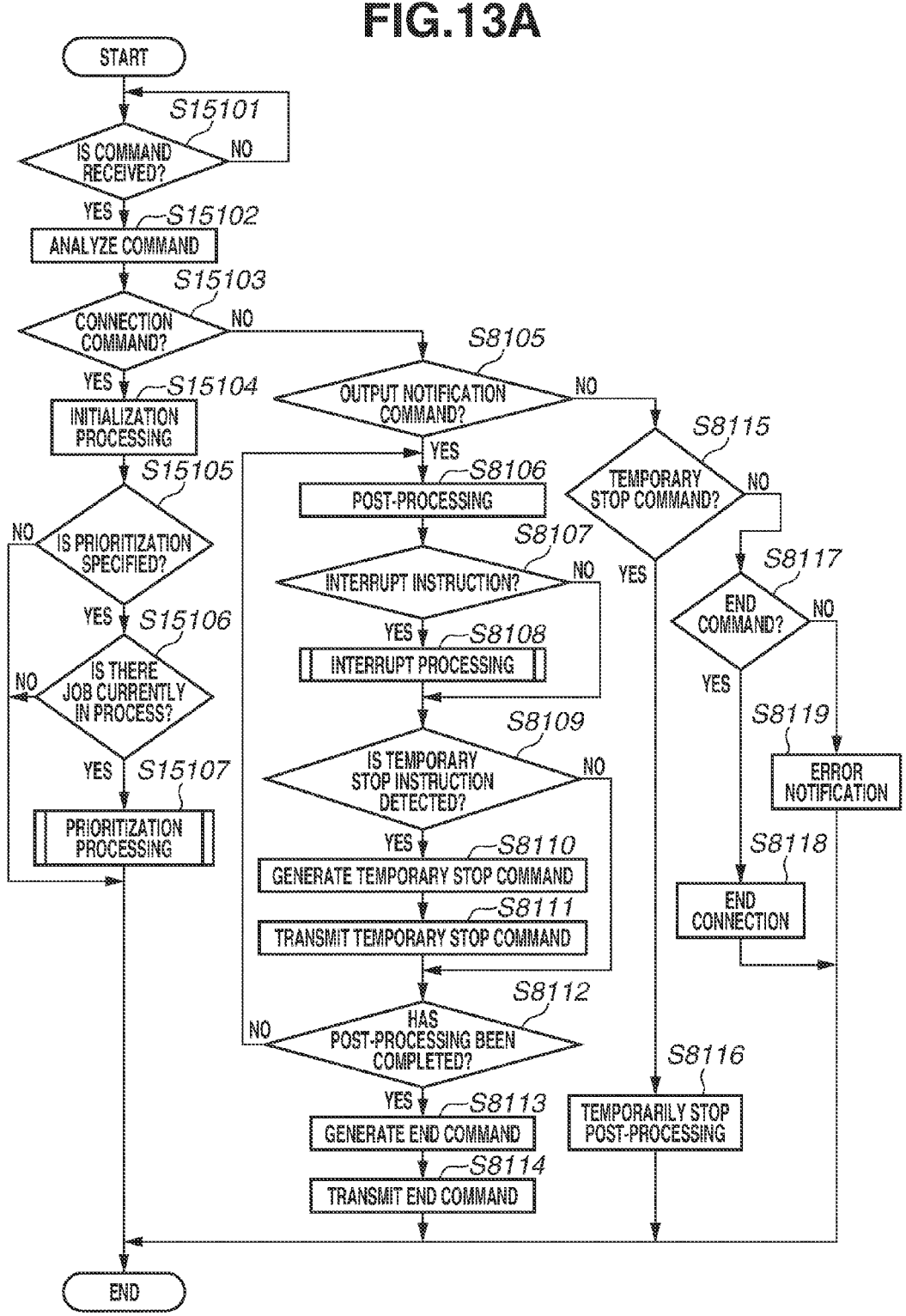
FIGS. 13A and 13B each illustrate a flow of processing performed by the post-processing apparatus according to the second exemplary embodiment.

FIG. 13A illustrates a flow from a time of when the post-processing apparatus 102 according to the present exemplary embodiment receives the command (the message) from another apparatus (in the following example, the image forming apparatus 1301 or 1302) until a time of when the post-processing apparatus 102 performs the processing according to the command. The program regarding each flow is stored in the storage unit 311 of the post-processing apparatus 102, and is read into the RAM 309 to be executed by the CPU 308. In the following processing, only differences (steps S15101 to S15107) from FIG. 8A will be described.

In step S15101, the communication processing unit 5201 determines whether the command (the message) is received. In a case where the communication processing unit 5201 determines that the command is received (YES in step S15101), the processing proceeds to step S15102. In step S15102, the command analysis unit 5202 analyzes the received command (the message). In step S15103, the command analysis unit 5202 determines whether the analyzed command is the connection command message 1100 or 1600 illustrated in FIG. 10B or 10C. In a case where the communication processing unit 5201 determines that the analyzed command is the connection command message 1100 or 1600 (YES in step S15103), the processing proceeds to step S15104. If the analyzed command is not the connection command message 1100 or 1600 (NO in step S15103), the processing proceeds to step S8105.

In step S15104, the communication processing unit 5201 performs the initialization processing for communication with the image forming apparatus 1301 or 1302. For example, the communication processing unit 5201 secures the memory (the area in the RAM 309) for the communication, generates the queue for receiving the job, registers the job information, and establishes the session for the communication. In step S15105, the command analysis unit 5202 determines whether the prioritization of the job is specified (Priority="100") in the connection command message 1100 or 1600 analyzed in step S15103. In a case where the command analysis unit 5202 determines that the prioritization of the job is specified (YES in step S15104), the processing proceeds to step S15106. In a case where the command analysis unit 5202 determines that the prioritization of the job is not specified (NO in step S15104), the processing is ended. In step S15106, the job control unit 5204 determines whether there is the job currently in process in the post-processing apparatus 102. In a case where the job control unit 5204 determines that there is the job currently in process (YES in step S15106), the processing proceeds to step S15107. In a case where the job control unit 5204 determines that there is not the job currently in process (NO in step S15106), the processing is ended. In step S15107, the job control unit 5204 performs prioritization processing illustrated in FIG. 13B.

Figure 13B:
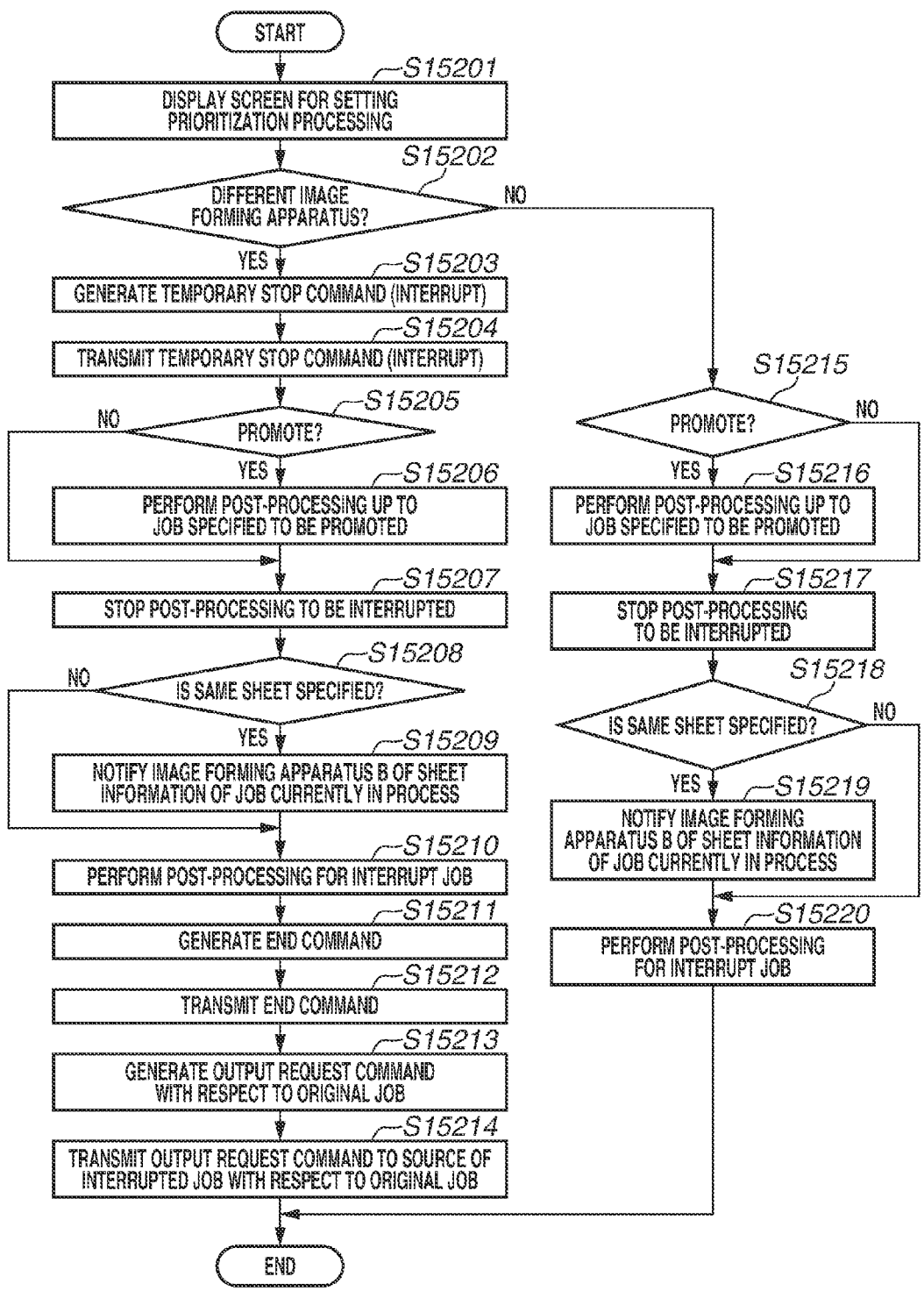

FIG. 13B illustrates a flow of the prioritization print processing performed by the post-processing apparatus 102 in step S15107 illustrated in FIG. 13A. The following example will be described, by way of example, based on the configuration in which the post-processing apparatus 102 is connected to the image forming apparatuses 1301 and 1302. The program regarding each flow is stored in the storage unit 311 of the post-processing apparatus 102, and is read into the RAM 309 to be executed by the CPU 308.

In step S15201, the job control unit 5204 displays a screen 1700 for setting the prioritization processing, such as a screen illustrated in FIG. 11B, via the operation unit 304. In the screen 1700 illustrated in FIG. 11B, a control 17001 is used for specifying whether to perform the interrupt processing on the job currently in process. In a case where the execution of the interrupt processing is specified, the promote setting can be further specified. The example illustrated in FIG. 11B indicates that the interrupt processing is executed after the processing is completed for the thirty-fourth set and the thirty-fifth set, which are supposed to be delivered to the same destination as the job currently in process. A control 17002 is used for specifying the sheet size about the job which interrupts the job currently in process in such a manner that this sheet size matches the sheet size of the job currently in process. For example, the image forming apparatus 1301 or 1302 is notified of this instruction, which causes the print processing to be started from the image forming apparatuses 1301 or 1302 with use of the same sheet as the current job, whereby the inconvenience of changing the stage (changing the setting) due to the change in the sheet size can be reduced.

In step S15202, the job control unit 5204 determines whether the image forming apparatus that has issued the job to be prioritized by interrupting the job currently in process is different from the image forming apparatus from which the post-processing apparatus 102 is receiving the job currently in process based on the information stored in the job information storage unit 5206. In a case where the job control unit 5204 determines that these image forming apparatuses are different from each other (YES in step S15202), the processing proceeds to step S15203. In a case where the job control unit 5204 determines that these image forming apparatuses are the same as each other (NO in step S15202), the processing proceeds to step S15215. In FIG. 13B, subsequent steps, steps S15203 to S15214 will be described assuming that the image forming apparatus A is the image forming apparatus that transmits a resource to be interrupted and the image forming apparatus B is the image forming apparatus that transmits another resource which interrupts the resource to be interrupted.

In step S15203, the command generation unit 5203 generates the temporary stop command (the "Pause" command). In this case, the temporary stop command includes the information on the interrupt instruction (the portions 61011 and 61012 in FIG. 6A). In step S15204, the communication processing unit 5201 transmits the temporary stop command generated in step S15203 to the image forming apparatus A from which the post-processing apparatus 102 is receiving the job currently in process (a source of the job to be interrupted).

In step S15205, the job control unit 5204 determines whether the promote instruction is included in the interrupt conditions input in step S15201. In a case where the job control unit 5204 determines that the promote instruction is included (YES in step S15205), the processing proceeds to step S15206. In a case where the job control unit 5204 determines that the promote instruction is not included (NO in step S15205), the processing proceeds to step S15207. In step S15206, the job control unit 5204 causes the post-processing unit 5208 to perform the post-processing up to the set specified in the promote instruction via the device control unit 5205. In the example illustrated in FIG. 11B, the post-processing unit 5208 performs the post-processing up to the thirty-fourth set and the thirty-fifth set specified in consideration of the work efficiency, which are supposed to be delivered to the same destination as the currently processed job received from the image forming apparatus A. In step S15207, the job control unit 5204 causes the post-processing unit 5208 to stop the post-processing for the current job via the device control unit 5205.

In step S15208, the job control unit 5204 determines whether the processing with use of the same sheet is specified as the specified sheet input in step S15201. In a case where the job control unit 5204 determines that the processing with use of the same sheet is specified (YES in step S15208), the processing proceeds to step S15209. In a case where the job control unit 5204 determines that the processing with use of the same sheet is not specified (NO in step S15208), the processing proceeds to step S15210. In step S15209, the job control unit 5204 notifies the image forming apparatus B of the sheet information about the resource that is currently being processed by the post-processing unit 5208 (the resource to be interrupted) based on the job information stored in the job information storage unit 5206.

In step S15210, the job control unit 5204 instructs the device control unit 5205, thereby causing the post-processing unit 5208 to perform the post-processing on the resource for the interrupt, which is received from the image forming apparatus B. In step S15211, the command generation unit 5203 generates the end command (the "Close" command). In step S15212, the communication processing unit 5201 transmits the end command generated in step S15211 to the image forming apparatus B. In step S15213, upon completion of the post-processing on the resource received from the image forming apparatus B, the command generation unit 5203 generates the output request command (the "Pull" command) to be transmitted to the image forming apparatus A with respect to the resource that is the interrupted. In step S15214, the communication processing unit 5201 transmits the output request command generated in step S15213 to the image forming apparatus A.

In step S15215, the job control unit 5204 determines whether the promote instruction is included in the interrupt conditions input in step S15201. In a case where the job control unit 5204 determines that the promote instruction is included (YES in step S15215), the processing proceeds to step S15216. In a case where the job control unit 5204 determines that the promote instruction is not included (NO in step S15215), the processing proceeds to step S15217. In step S15216, the job control unit 5204 causes the post-processing unit 5208 to perform the post-processing up to the set specified in the promote instruction via the device control unit 5205. In the example illustrated in FIG. 11B, the post-processing unit 5208 performs the post-processing up to the thirty-fourth set and the thirty-fifth set specified in consideration of the work efficiency, which are supposed to be delivered to the same destination as the currently processed job received from the image forming apparatus A. In step S15217, the job control unit 5204 causes the post-processing unit 5208 to stop the post-processing for the current job via the device control unit 5205.

In step S15218, the job control unit 5204 determines whether the processing with use of the same sheet is specified as the specified sheet input in step S15201. In a case where the job control unit 5204 determines that the processing with use of the same sheet is specified (YES in step S15218), the processing proceeds to step S15219. In a case where the job control unit 5204 determines that the processing with use of the same sheet is not specified (NO in step S15218), the processing proceeds to step S15220. In step S15219, the job control unit 5204 notifies the image forming apparatus B of the sheet information about the resource that is currently being processed by the post-processing unit 5208 (the resource to be interrupted) based on the job information stored in the job information storage unit 5206.

In step S15220, the job control unit 5204 instructs the device control unit 5205, thereby causing the post-processing unit 5208 to perform the post-processing on the resource for the interrupt, which is received from the image forming apparatus B.

In the above-described exemplary embodiment, the information regarding the interrupt is input from the screen 1200 or 1700 that is the user interface of the post-processing apparatus 102, but the input method is not limited thereto. For example, the information regarding the interrupt may be input with use of a barcode.

The above-described exemplary embodiment allows the post-processing apparatus 102 to efficiently perform the interrupt processing by appropriately notifying each of the image forming apparatuses 1301 and 1302 of the command with respect to the job that should be processed preferentially even when the information processing system includes the plurality of image forming apparatuses 1301 and 1302.

According to the above-described exemplary embodiments, the print processing performed by the image forming apparatus can be interrupted according to the instruction from the post-processing apparatus that performs the post-processing on the product printed by the image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-081160, filed Apr. 10, 2015, which is hereby incorporated by reference herein in its entirety.

What is claimed is:

1. A system comprising:
   a printing apparatus; and
   a post-processing apparatus,
   wherein the post-processing apparatus includes:
   a processor; and
   a memory storing at least one program which, when executed by the processor, causes the post-processing apparatus to:
   perform post-processing on a product printed by the printing apparatus, and
   transmit, to the printing apparatus, instruction information including a first instruction to cause the printing apparatus to perform re-printing processing on a first job subjected to print processing performed by the printing apparatus and a second instruction to cause the printing apparatus to perform re-printing processing on the first job preferentially,
   wherein the instruction information includes job information identifying the first job, and
   wherein the printing apparatus includes:
   a processor; and
   a memory storing at least one program which, when executed by the processor of the printing apparatus, causes the printing apparatus to:
   store information about at least one print job in a storage;
   receive, from the post-processing apparatus, the instruction information;
   identify information about the first job from the information about the at least one print job stored in the storage based on job information included in the instruction information; and
   perform control in such a manner that the printing apparatus performs the re-printing processing for the first job preferentially over print processing for a second job for which printing has not been completed, based on the identified information about the first job and the second instruction.

2. The system according to claim 1, wherein the printing apparatus performs control in such a manner that the printing apparatus stops the print processing for the second job in process and starts the re-printing processing for the first job, based on the instruction information.

3. The system according to claim 1, wherein the printing apparatus receives the instruction information, and processing information indicating processing that should be performed before the first job is processed, and
   wherein the printing apparatus performs control in such a manner that the printing apparatus performs the processing that should be performed before the first job is processed and then performs the re-printing processing for the first job, based on the instruction information and the processing information.

4. The system according to claim 3, wherein the processing information indicating the processing that should be performed before the first job is processed is information indicating up to where the print processing should be performed for the second job in process.

5. The system according to claim 1,
   wherein the instruction information further includes print setting information, and
   wherein the printing apparatus identifies information about the first job from the information about the print job stored in the storage based on the job information included in the instruction information, and recreates the identified information about the first job based on the print setting information.

6. The system according to claim 1, wherein a sheet conveyance system is not connected between the printing apparatus and the post-processing apparatus, and the printing apparatus and the post-processing apparatus are connected via a network.

7. The system according to claim 1,
   wherein the post-processing apparatus receives instruction information regarding post-processing via a network, and
   wherein the post-processing apparatus performs post-processing on a print product printed by the printing apparatus, based on the instruction information regarding the post-processing.

8. A printing apparatus comprising:
   a processor; and
   a memory storing at least one program which, when executed by the processor, causes the printing apparatus to:
   store information about at least one print job in a storage;
   receive instruction information including a first instruction to perform re-printing processing on a first job subjected to print processing and a second instruction to perform re-printing processing on the first job preferentially, from a post-processing apparatus configured to perform post-processing on a product printed by the printing apparatus, wherein the instruction information includes job information identifying the first job;
   identify information about the first job from the information about the at least one print job stored in the storage based on job information included in the instruction information; and
   perform control in such a manner that the printing apparatus performs the re-printing processing for the first job preferentially over print processing for a second job for which printing has not been completed, based on the identified information about the first job and the second instruction.

9. The printing apparatus according to claim 8, wherein the printing apparatus performs control in such a manner that the printing apparatus stops the print processing for the second job in process and starts the re-printing processing for the first job, based on the instruction information.

10. The printing apparatus according to claim 8, wherein the printing apparatus receives the instruction information, and processing information indicating processing that should be performed before the first job is processed, and
    wherein the printing apparatus performs control in such a manner that the printing apparatus performs the processing that should be performed before the first job is processed and then performs the re-printing processing for the first job, based on the instruction information and the processing information.

11. The printing apparatus according to claim 10, wherein the processing information indicating the processing that should be performed before the first job is processed is information indicating up to where the print processing should be performed for the second job in process.

12. The printing apparatus according to claim 8,
    wherein the instruction information further includes print setting information, and
    wherein the printing apparatus identifies information about the first job from the information about the print job stored in the storage based on the job information included in the instruction information, and recreates the identified information about the first job based on the print setting information.

13. The printing apparatus according to claim 8, wherein a sheet conveyance system is not connected between the printing apparatus and the post-processing apparatus, and the printing apparatus and the post-processing apparatus are connected via a network.

14. A method for controlling a printing apparatus, the method comprising:

storing information about at least one print job in a storage;

receiving instruction information including a first instruction to perform re-printing processing on a first job subjected to print processing and a second instruction to perform re-printing processing on the first job preferentially, from a post-processing apparatus configured to perform post-processing on a product printed by the printing apparatus, wherein the instruction information includes job information identifying the first job;

identifying information about the first job from the information about the at least one print job stored in the storage based on job information included in the instruction information; and performing control in such a manner that the printing apparatus performs the re-printing processing for the first job preferentially over print processing for a second job for which printing has not been completed, based on the identified information about the first job and the second instruction.

15. A non-transitory computer-readable storage medium storing a program for causing a computer to execute a method for controlling a printing apparatus, the method comprising:

storing information about at least one print job in a storage;

receiving instruction information including a first instruction to perform re-printing processing on a first job subjected to print processing and a second instruction to perform re-printing processing on the first job preferentially, from a post-processing apparatus configured to perform post-processing on a product printed by the printing apparatus, wherein the instruction information includes job information identifying the first job;

identifying information about the first job from the information about the at least one print job stored in the storage based on job information included in the instruction information; and performing control in such a manner that the printing apparatus performs the re-printing processing for the first job preferentially over print processing for a second job for which printing has not been completed, based on the identified information about the first job and the second instruction.

* * * * *